(12) United States Patent  
Sangu et al.

(10) Patent No.: US 7,630,132 B2  
(45) Date of Patent: Dec. 8, 2009

(54) POLARIZATION CONTROL DEVICE

(75) Inventors: Suguru Sangu, Tokyo (JP); Hiroaki Fukuda, Tokyo (JP); Masato Takada, Kanagawa (JP); Izumi Itoh, Tokyo (JP); Junichi Takahashi, Kanagawa (JP); Taroh Terashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 320 days.

(21) Appl. No.: 11/438,716

(22) Filed: May 22, 2006

(65) Prior Publication Data

US 2006/0262398 A1 Nov. 23, 2006

(30) Foreign Application Priority Data

| May 23, 2005 | (JP) | ............................... 2005-150072 |
| May 23, 2005 | (JP) | ............................... 2005-150073 |
| May 23, 2005 | (JP) | ............................... 2005-150074 |
| May 23, 2005 | (JP) | ............................... 2005-150075 |

(51) Int. Cl.  
  *G02B 5/30* (2006.01)
(52) U.S. Cl. ...................................... 359/486; 359/485
(58) Field of Classification Search .................. 359/486, 359/485  
See application file for complete search history.

(56) References Cited

U.S. PATENT DOCUMENTS

| 2,224,214 | A | 12/1940 | Brown |
| 2002/0191286 | A1* | 12/2002 | Gale et al. ................... 359/486 |
| 2003/0142400 | A1* | 7/2003 | Hansen et al. ............... 359/486 |
| 2004/0125449 | A1* | 7/2004 | Sales ........................... 359/486 |
| 2005/0141090 | A1* | 6/2005 | Huang et al. ................ 359/486 |
| 2005/0195485 | A1* | 9/2005 | Hirai et al. ................... 359/569 |
| 2006/0032312 | A1* | 2/2006 | Auner et al. .................. 73/570 |

FOREIGN PATENT DOCUMENTS

| JP | 6-27427 | 2/1994 |
| JP | 8-304625 | 11/1996 |
| JP | 10-153706 | 6/1998 |
| JP | 2001/318217 | 11/2001 |
| JP | 2002/122733 | 4/2002 |
| JP | 2003/502708 | 1/2003 |
| JP | 2003/315782 | 11/2003 |
| JP | 2004/61905 | 2/2004 |
| JP | 2004/157159 | 6/2004 |
| JP | 2004/279696 | 10/2004 |
| JP | 2004/279705 | 10/2004 |
| JP | 2004/279962 | 10/2004 |

(Continued)

OTHER PUBLICATIONS

Canfield, Brian K., et al., "Linear and Nonlinear Optical Responses Influenced by Broken Symmetry in an Array of Gold Nanoparticles", Optical Express 5418, vol. 12, No. 22, Nov. 2004.

(Continued)

*Primary Examiner*—Joshua L Pritchett  
(74) *Attorney, Agent, or Firm*—Cooper & Dunham, LLP

(57) ABSTRACT

A polarization control device includes a support substrate on which a metal compound structure is formed. The metal compound structure is formed with at least two metal fine structures arranged periodically in a range equal to or smaller than a wavelength of an incident light.

21 Claims, 19 Drawing Sheets

FOREIGN PATENT DOCUMENTS

| | | |
|---|---|---|
| JP | 2004/279963 | 10/2004 |
| JP | 2004/279964 | 10/2004 |
| JP | 2004/302050 | 10/2004 |
| JP | 2004/302343 | 10/2004 |
| JP | 2004/302344 | 10/2004 |
| JP | 2004/309751 | 11/2004 |
| JP | 2004/309903 | 11/2004 |
| JP | 2005/158191 | 6/2005 |
| WO | WO00/79317 A1 | 12/2000 |
| WO | WO03/054592 A2 | 7/2003 |
| WO | WO03/054592 A3 | 7/2003 |

OTHER PUBLICATIONS

Schmitz, Martin, et al., "Rigorous Concept for the Design of Diffractive Microlenses with High Numerical Apertures", Optical Society of America, vol. 14, No. 4, Apr. 1997.

* cited by examiner

METAL COMPOUND STRUCTURE

METAL COMPOUND STRUCTURE (RIGHT-HAND ARRANGEMENT)

METAL COMPOUND STRUCTURE (LEFT-HAND ARRANGEMENT)

DEFORMATION BY PIEZOELECTRIC EFFECT

POLARIZATION CONTROL DEVICE

CROSS-REFERENCE TO RELATED APPLICATIONS

The present document incorporates by reference the entire contents of Japanese priority documents, 2005-150072 filed in Japan on May 23, 2005, 2005-150073 filed in Japan on May 23, 2005, 2005-150074 filed in Japan on May 23, 2005, and 2005-150075 filed in Japan on May 23, 2005.

BACKGROUND

1. Technical Field

This disclosure generally relates to an image forming apparatus that forms an image by a recording head which ejects ink droplets of recording liquid.

2. Description of the Related Art

A conventional polarization control device such as a polarizer or a wavelength plate makes propagation characteristics and absorption characteristics anisotropic relative to two orthogonal directions. The device thereby transmits one of two components of an incident light in two polarization directions, or modulates a phase of the incident light to change a polarized state of the incident light from a linear polarized state to a circular polarized state. The device of this type is used, for example, to turn on or off pixels on a liquid crystal panel or an organic electroluminescence (EL) display. In addition, the device is used for an optical measurement technique such as an ellipsometry (polarization analysis), and in any one of various optical apparatuses and measurement apparatuses such as a laser interferometer and an optical shutter. Demand for the polarization control device rises particularly for an image projecting apparatus such as a liquid crystal projector.

The polarizer is a device that transforms a naturally polarized light into a linearly polarized light, and that transmits only one of two orthogonal polarized components of the incident light while shielding the other polarized component by absorption (or reflection and scattering). Most of the polarizers currently available and particularly used in liquid crystal panels are each configured so that a dichroic material such as iodine or an organic dye is colored and attached onto a substrate film consisting of polyvinyl alcohol or the like. In addition, the resultant film is drawn and oriented in an advanced fashion, thereby expressing absorption dichroism.

On the other hand, a retardation plate (or phase shifter) such as a half-wave plate or a quarter-wave plate consists of a birefringent optical crystal, and modulates a polarized state by a difference in refractive index between an ordinary ray and an extraordinary ray. The retardation plate for which an optical path difference between the ordinary ray and the extraordinary ray is a half of a wavelength of the incident light is the half-wave plate. That for which the optical difference is a quarter of the wavelength thereof is the quarter-wave plate. As the material that exhibits the birefringence, calcite or crystal is used.

However, the conventional polarization control device making use of absorption has the following disadvantages. The device is apt to be influenced by heat, so that a transparency of the device is deteriorated and the device is burnt. As a result, an amount of irradiation light cannot be increased. In addition, utilization temperature conditions for the device are strict. For this reason, if the device is used in the liquid crystal projector or the like, it is necessary to provide a cold air blasting mechanism in the projector, whereby it is difficult to make the projector small in size. Furthermore, because of adhesion of dust to the device, an image-quality defect occurs.

The conventional polarization control device using anisotropy of the refractive index has the following disadvantages. Optical crystal materials exhibiting birefringence are limited in number and available wavelength ranges are limited. By bonding the optical crystal materials, a film thickness, i.e., an optical path difference is adjusted, and the polarized state is controlled. Therefore, the polarization control device is largely dependent on the optical crystal materials and low in flexibility of polarization control. In addition, it is difficult to make the polarizer small in size and thin per se.

To overcome the problems, various conventional techniques are disclosed including a polarizer that blocks one of the two polarized components of the incident light. Therefore, with a configuration of an optical system constituted only by this polarizer, optical energy of the incident light is lost by at least 50%. In addition, the wire-grid polarizer cannot ensure a sufficient extinction ratio.

A mechanism that can control a plane of polarization according to a nanoscale metal pattern is also disclosed. Similarly, since this mechanism is based on an operation principle using the anisotropy of absorption and scattering, high optical utilization efficiency cannot be attained.

Another conventional technology has a function corresponding to a phase plate and transforming a linearly polarized light into an elliptically polarized light using chirality of a nanoscale metal pattern. However, this function cannot ensure a high ellipticity. It is, therefore, difficult to realize a practical half-wave plate or quarter-wave plate using this function. In addition, a structure of the function is complicated, and it is difficult to accurately manufacture a structure having uniform chirality because of low machining accuracy. The shape irregularity makes it impossible to obtain desired polarization control characteristics.

Furthermore, the polarization control devices according to the conventional techniques are all passive optical devices having optical response characteristic of the respective devices. If a function to be realized is more complicated, the number of optical devices increases. This imposes restrictions on making an optical system small in size and light in weight.

BRIEF SUMMARY

A polarization control device according to an aspect of the present invention includes a support substrate on which a metal compound structure is formed. The metal compound structure is formed with at least two metal fine structures arranged periodically in a range equal to or smaller than a wavelength of an incident light.

The above and other aspects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below in detail below with reference to the accompanying drawings.

Figure 1:
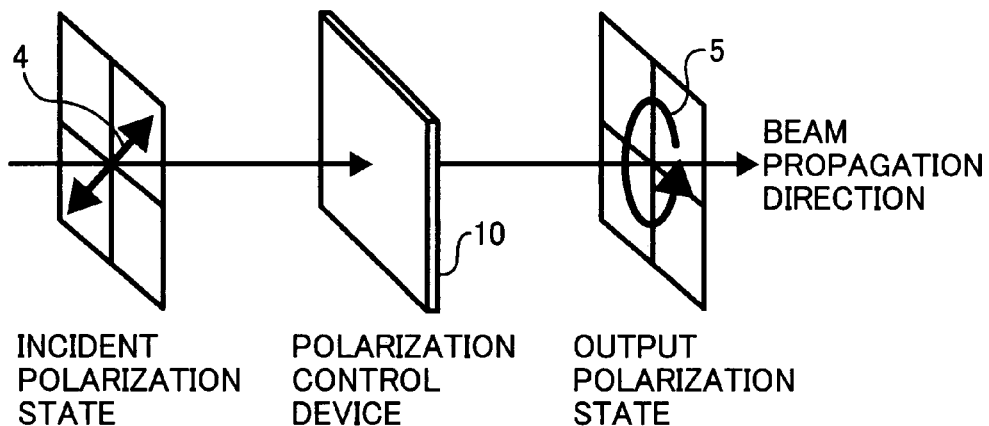
FIG. 1 is an explanatory view of a function of a polarization control device according to a first embodiment of the present invention.

FIG. 1 is an explanatory view of a function of a polarization control device 10 according to a first embodiment of the present invention. The polarization control device 10 according to the first embodiment modulates a polarized state of an incident linearly-polarized light 4 by an interaction between metal compound structures contained in the device and the light, and uses the modulated light as a polarization-controlled elliptically polarized light 5. In FIG. 1, an example of transforming the linearly polarized light 4 into a circularly polarized light 4 by the polarization control device 10 according to the first embodiment is shown. The polarization control device 10 according to the first embodiment is equal in function to a conventional quarter-wave plate.

Figure 2:
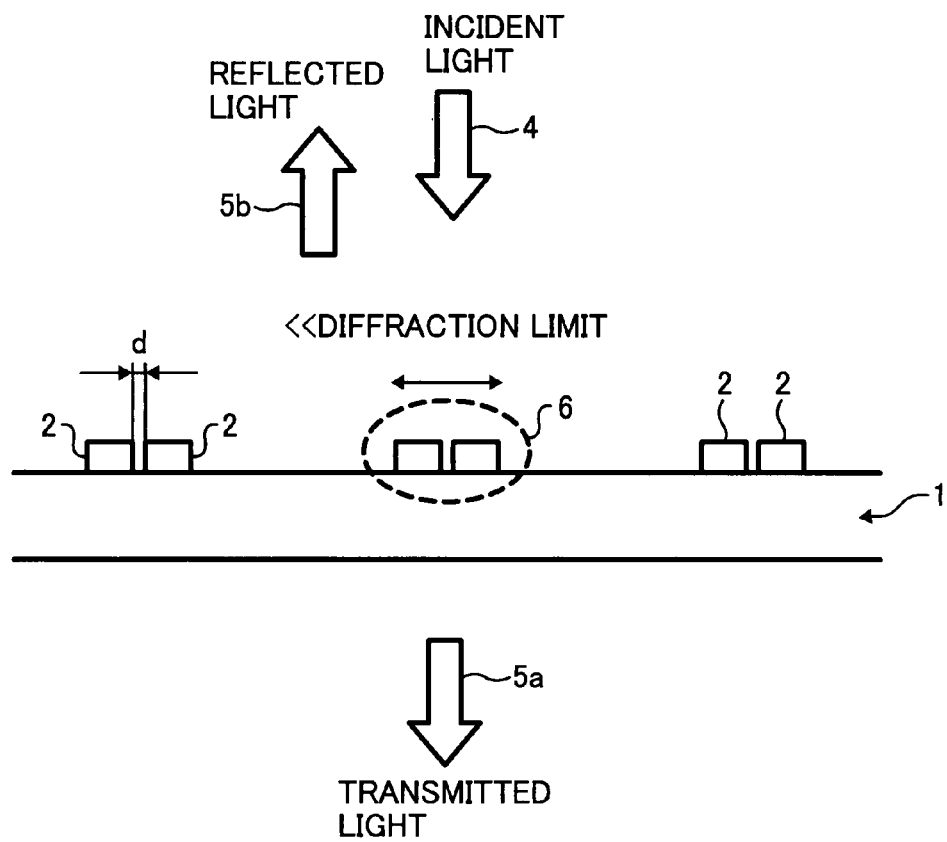
FIG. 2 is a cross-sectional view of a configuration of the polarization control device shown in FIG. 1.

FIG. 2 is a cross-sectional view of a configuration of the polarization control device 10 according to the first embodiment shown in FIG. 1. The polarization control device 10 according to the first embodiment has a structure of a periodic array of metal compound structures 6 on a support substrate 1. Each of the metal compound structures 6 is configured as follows. Metal fine structures 2 (cylindrical structures in the example of FIG. 2) each at a size equal to or smaller than a diffraction limit of the incident light (about the wavelength of the incident light) are adjacent to each other in a range equal to or smaller than the wavelength of the light. The light is incident from an upper plane, in which the metal fine structures 2 are present. If the device is used as a reflecting polarization control device, a transmission polarization control device, or a component isolation polarization control device, then a reflected light 5b, a transmitted light 5a, or both the transmitted light 5a and the reflected light 5b are used as a polarization-controlled emission light, respectively.

Figure 3A:
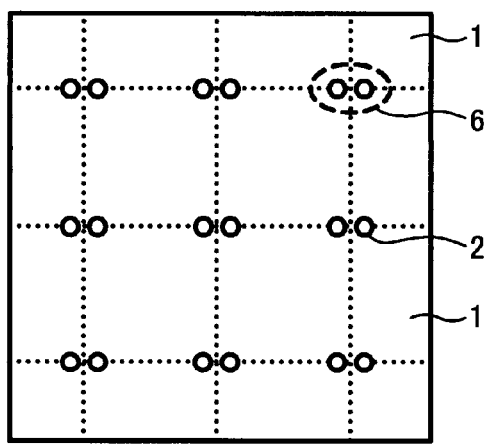
FIG. 3A is an explanatory view of an example of a square lattice array of metal compound structures shown in FIG. 2.
Figure 3B:
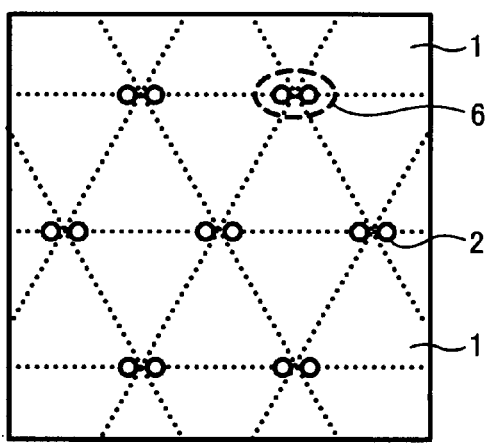
FIG. 3B is an explanatory view of an example of a hexagonal lattice array of the metal compound structures shown in FIG. 2.
Figure 3C:
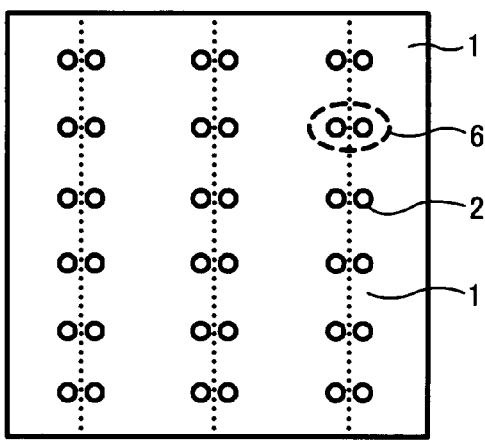
FIG. 3C is an explanatory view of an example of a stripe array of the metal compound structures shown in FIG. 2.

FIGS. 3A, 3B, and 3C are explanatory views of examples of the periodic array of the metal compound structure 6 shown in FIG. 2, respectively. FIG. 3A is a plan view of a configuration of the polarization control device 10 according to the first embodiment if the metal compound structures 6 are arranged at respective lattice points of a square lattice. FIG. 3B is a plan view of a configuration of the polarization control device 10 according to the first embodiment if the metal compound structures 6 are arranged at respective lattice points of a hexagonal lattice. FIG. 3C is a plan view of a configuration of the polarization control device 10 according to the first embodiment if the metal compound structures 6 are arranged into stripes. The periodic structure provides an angle dependency and a wavelength dependency of the polarization control device 10 according to the first embodiment. Symmetry, a period, pitches and the like are adjusted according to a purpose of use of the polarization control device 10 according to the first embodiment.

The support substrate 1 used in the polarization control device 10 according to the first embodiment preferably consists of a material having a low absorbance at a wavelength in a visible range to ensure high efficiency if the transmission device is used as the polarization control device 10 according to the first embodiment. Examples of this material include quartz glass, borosilicate glass such as $BK_7$ and Pyrex, and optical crystal materials such as $CaF_2$, Si, ZnSe, and $Al_2O_3$. If the reflecting device is used as the polarization control device 10 according to the first embodiment, the support substrate 1 preferably consists of a material having a high reflectance. Examples of this material include optical glasses and optical crystal materials each coated with a metal film such as an Al film or an Au film. A thickness of the metal film needs to be larger than a skin depth by which the light is permeated into the metal. In this embodiment, the metal film has a thickness of about 30 nanometers to 100 nanometers. Alternatively, the optical glass or optical crystal material coated with a dielectric multilayer film by total reflection coating can be used as this material. If the polarization control device 10 according to the first embodiment is used as a beam splitter or the like using both of the transmitted light and the reflected light, the support substrate 1 preferably consists of a material coated with a Cr film, as a partially reflecting film.

The metal fine structure 2 and the metal compound structure 6 constituted by the metal fine structures 2 that serve as a mechanism that modulates the polarized state of the incident light in the polarization control device 10 according to the first embodiment will be explained. A material for the metal fine structure 2 needs to be able to excite surface plasmon or local surface plasmon. The surface plasmon is a collective movement of electrons excited toward a metal side of an interface region between the metal and the dielectric. The local surface plasmon is a collective movement of electrons excited throughout the metal material if the metal structure is fine. The surface plasmon and the local surface plasmon will be equally referred to as "plasmon" hereinafter. The plasmon is coupled with an electromagnetic field near the metal fine structures 2, converted into a propagated light component, and emitted to a distant location. Conversion efficiency for conversion to the propagated light is maximized near a resonance frequency determined by the metal fine structures 2. The metal materials that can excite the plasmon include gold (Au), silver (Ag), platinum (Pt), aluminum (Al), copper (Cu), and the like. A structure in which two or more metal fine structures 2 thus configured are arranged proximately will be referred to as the "metal compound structure 6". The plasmon is a collective movement of electrons in the metal.

The polarization control device 10 according to the first embodiment shown in FIG. 2 is constituted by the metal compound structures 6 each configured so that two cylindrical metal dots are arranged to be apart from each other by a distance d. A shape of each metal fine structure 2 is not limited to a cylindrical shape but can be a semicircular shape in view of easy machining. Each metal compound structure 6 needs to be present in a range small enough with respect to the diffraction limit of the incident light. For this reason, a size of the metal fine structure 2 is limited preferably to 10 nanometers to 100 nanometers. As for a light emitted from a distant location or a light observed at a distant location, the arrangement and shape of the metal compound structures 6 are not observed due to limitation caused by the diffraction limit of the light. Nevertheless, thanks to the interaction between the plasmon generated in the metal compound structures 6 and that via the near-field light, an intensity of the emitted light and a phase difference of the light relative to a direction of vibration are changed, depending on the size and arrangement of the metal fine structures 2.

The metal fine structure 2 and the metal compound structure 6 can be manufactured by various machining methods. For instance, a direct drawing method using electron beam lithography, a batch-exposure method using far or extreme ultraviolet radiation (EUV) lithography or deep ultraviolet radiation (DUV) lithography, or a method using nanoimprint lithography for thermally pressing a die called "mold". In addition, a method including changing material characteristics by irradiating a phase change material or a transition metal oxide material with a laser beam, and etching the material using a difference in etch rate can be used to manufacture the structures 2 and 6.

Figure 4A:
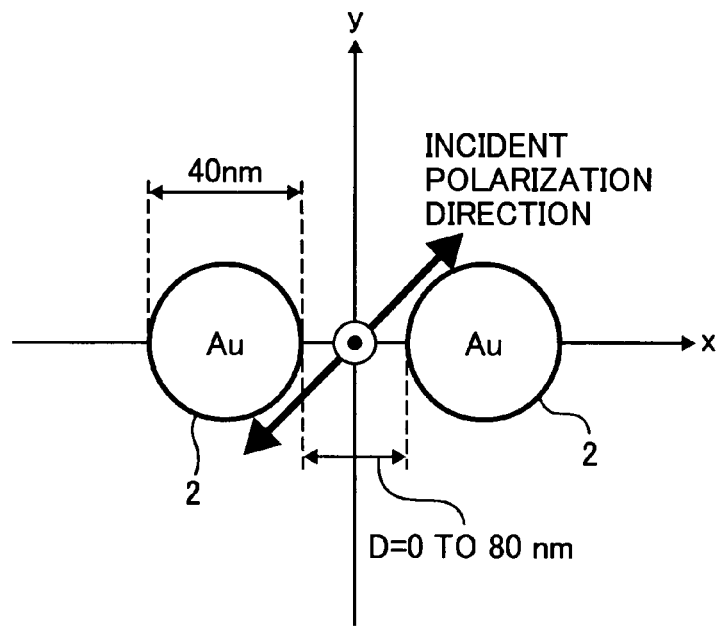
FIG. 4A is an explanatory view of a model (1) used in a numerical calculation.
Figure 4B:
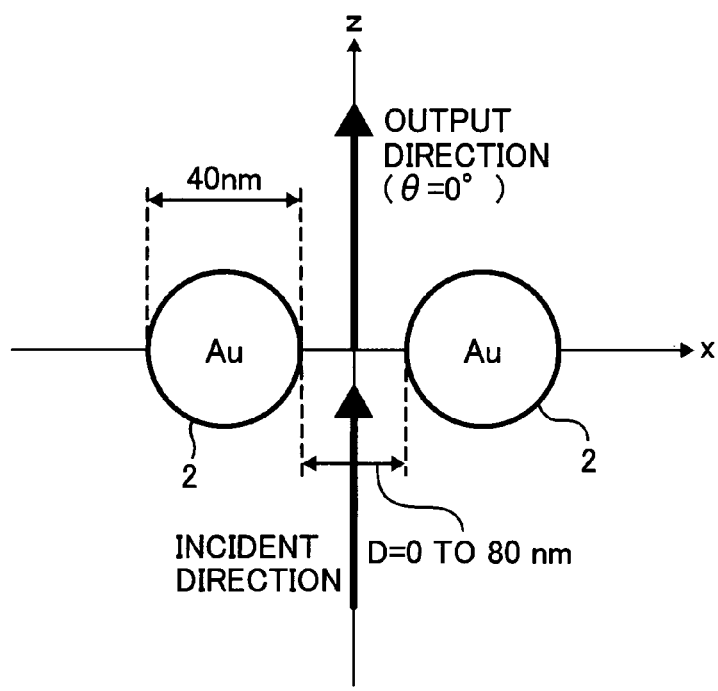
FIG. 4B is an explanatory view of a model (2) used in a numerical calculation.

A principle that the polarized state of the light incident on the metal compound structure 6 manufactured by one of these methods is changed depending on the structure 6 will be explained based on the result of a numerical calculation. For the numerical calculation, a finite-difference time-domain (FDTD) method is used for solution of Maxwell's equations that represent an electromagnetic field motion by approximating the equations to spatio-temporal differential equations. FIGS. 4A and 4B represent models used for the numerical calculation. In the calculation, while the distance d between proximate ends of two Au spheres each at a size (diameter) of 40 nanometers present in the air is changed from 0 nanometer to 80 nanometers, a change in the polarized state of the incident light in a reflection far-field is tested. As optical constants of Au, a refractive index n of 0.072 and k of 1.496 are used. These constants are set in view of changes in optical constants depending on the size of the metal sphere.

To obtain characteristics of a far-field light from a field distribution near the metal compound structures 6 (referred to as "Au spheres" in this example) obtained by the FDTD method, a component of the far-field light at an angle θ of 0 degrees is extracted by subjecting the field distribution to Fourier Transform. In addition, an amplitude ratio and a phase difference between x and y directions shown in FIGS. 4A and 4B are calculated. Specifically, using a wavelength of 544 nanometers near a plasmon resonance wavelength of the 40-nanometer Au fine spheres, a plane wave a field vibration of which is in a direction of 45 degrees with respect to the x axis within an xy plane shown in FIGS. 4A and 4B is irradiated on the Au spheres.

Figure 5A:
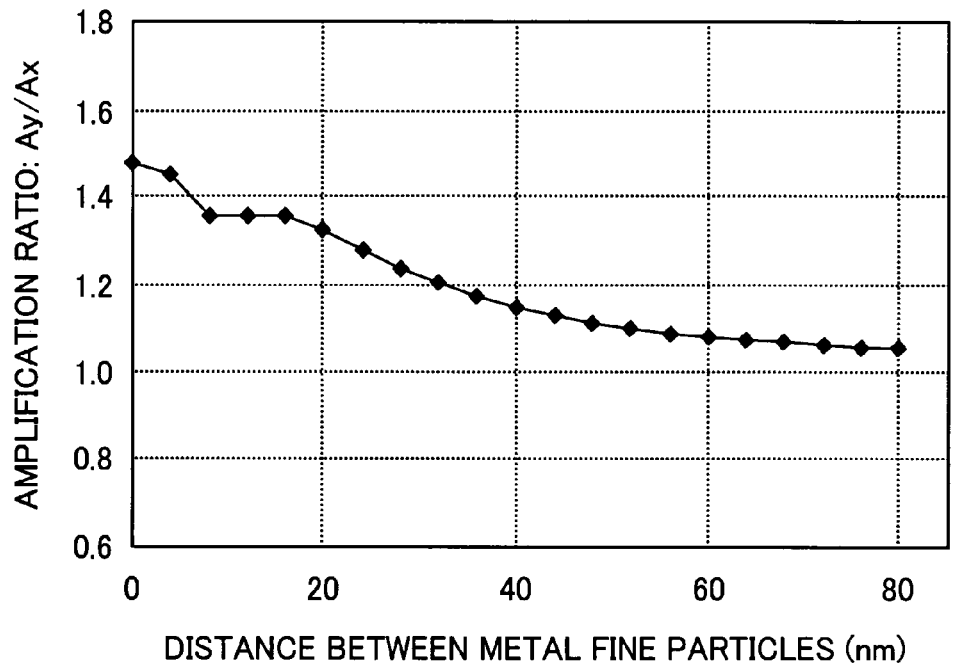
FIG. 5A is a graph of an amplitude ratio obtained by the numerical calculation.
Figure 5B:
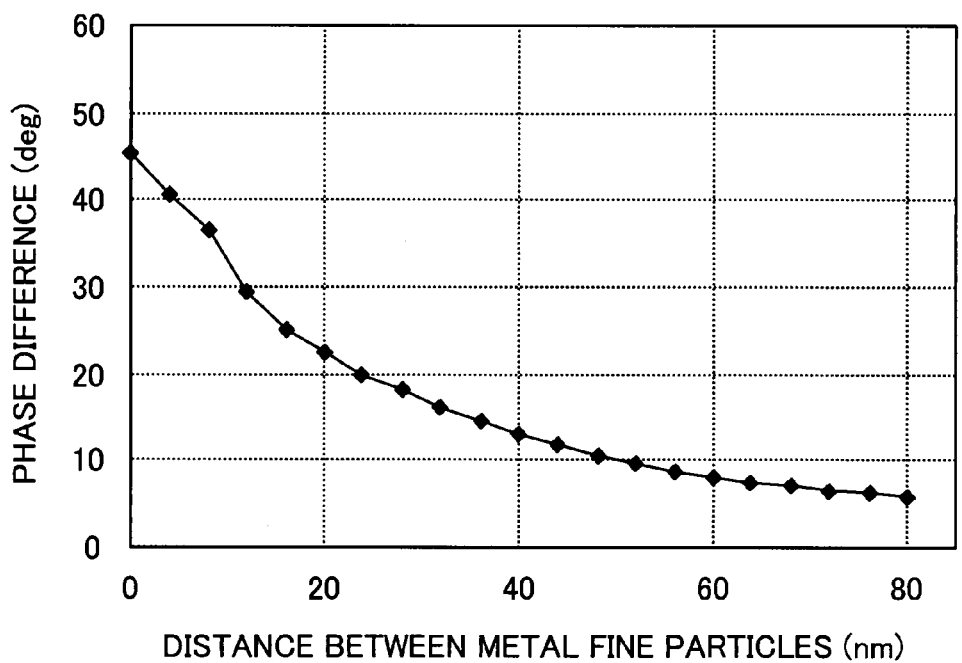
FIG. 5B is a graph of a phase different obtained by the numerical calculation.

FIG. 5A is a graph of the amplitude ratio. As evident from FIG. 5A, the amplitude ratio nears one and a plane of polarization (vibration direction of the field) coincides with a polarization direction of the incident light in a range in which the distance d is large. On the other hand, if the distance d is nearer to zero (d=0), the amplitude ratio is higher, that is, the plane of polarization is inclined in a direction of the y axis. FIG. 5B is a graph of the phase difference between an x component and a y component of the electric field. As evident from FIG. 5B, if the distance d is closer to zero (d=0), the phase difference is greater, and if the distance d is zero (d=0), the phase difference is about 45 degrees. A result of the simulation using the FDTD method indicates that the plane of polarization can be rotated by controlling the distance d between the Au fine spheres. In addition, the polarized state can be transformed from, for example, the linearly polarized state to the elliptically polarized state. A similar calculation result can be obtained if Ag fine spheres are used as the material for the metal fine structures 2. In this case, a wavelength range in which the polarized state is changed nears the wavelength of 400 nanometers, which is near the plasmon resonance wavelength of the Ag fine spheres.

Figure 6:
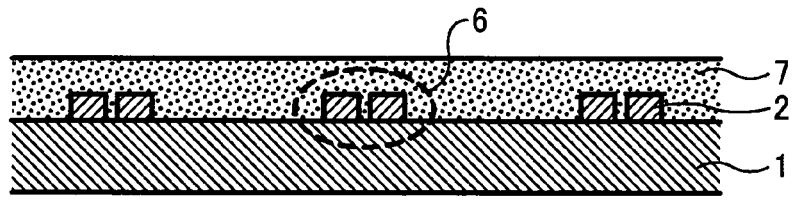
FIG. 6 is an explanatory view of an example of a polarization control device including metal fine structures and metal compound structures covered with a dielectric thin film.

Meanwhile, the metal compound structure 6 is not necessarily exposed to the air. It is rather preferable that metal compound structure 6 is covered with a protection film consisting of a dielectric so as to prevent deteriorations in the metal fine structures 2 as well as the metal compound structure 6. If the protection film is provided, a resonance wavelength of the plasmon excited in each metal fine structure 2 is shifted depending on optical constants (a refractive index and an extinction coefficient) of a material for the protection film of each metal fine structure 2. Accordingly, the protection film also acts to adjust the resonance frequency of the plasma. FIG. 6 is an explanatory view of one example of the polarization control device 10 according to the first embodiment that includes the metal fine structures 2 and the metal compound structures 6 covered with a dielectric thin film 7, which is the protection film. The dielectric thin film 7 needs to consist of a material low in absorbance. For example, a transition metal oxide, e.g., ZnS—SiO$_2$ used as a protection layer for protecting an optical recording medium can be used as the material for the dielectric thin film 7.

Figure 7:
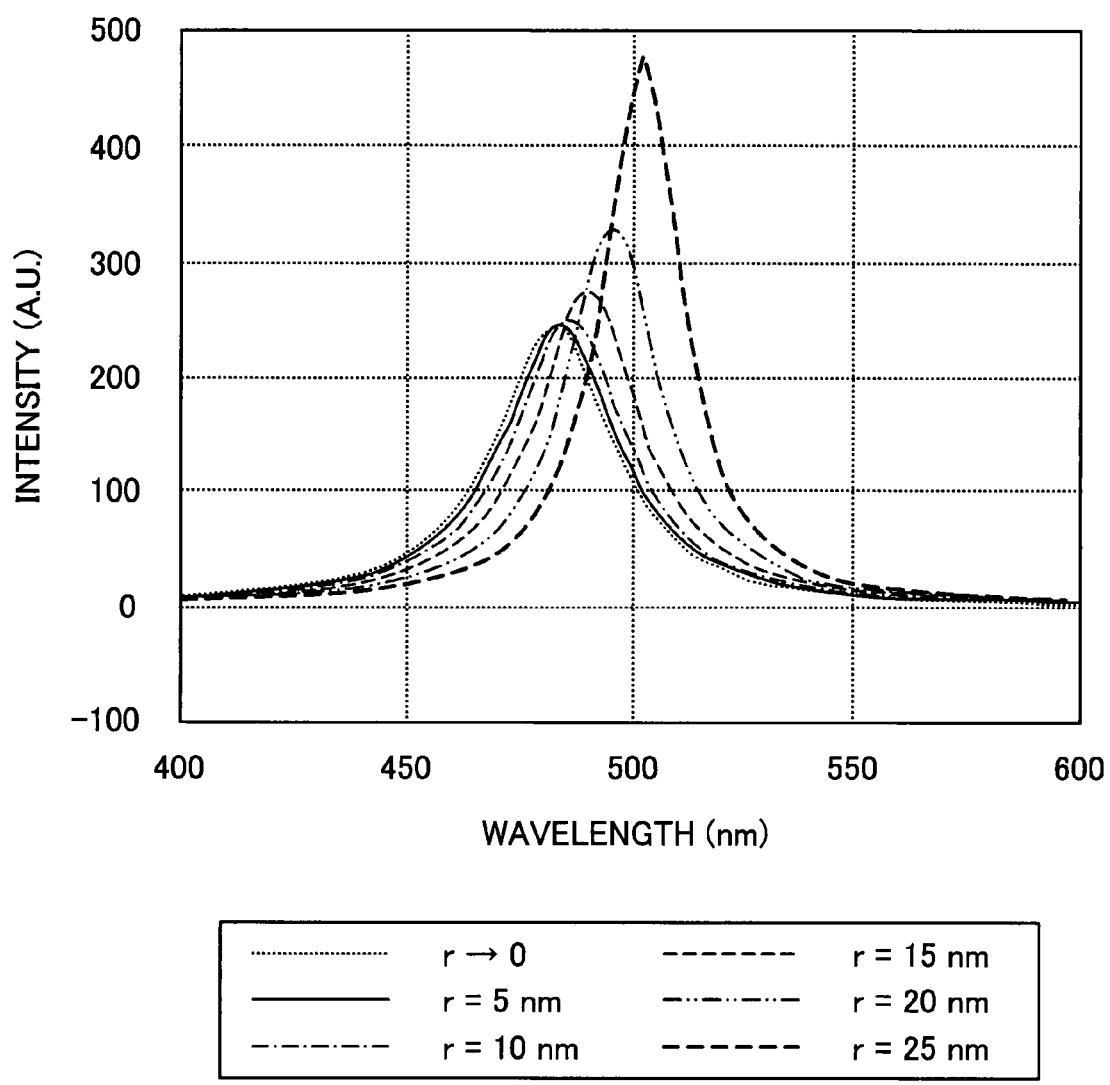
FIG. 7 is a graph of plotting a filed intensity in a central portion of a single Au fine sphere analytically calculated based on the Mie scattering theory and arranged in the air.

The plasmon resonance wavelength is changed while depending not only on the dielectric thin film 7 covered on the metal compound structures 6 and the metal fine structures 2 but also on the size of the metal fine structure 2 itself. FIG. 7 is a graph of plotting a filed intensity in a central portion of a single Au fine sphere analytically calculated based on the Mie scattering theory and arranged in the air. If a diameter of the Au fine sphere is about 5 nanometers, the plasmon resonance wavelength hardly depends on the size. However, at the diameter of about 5 nanometers, the resonance wavelength is shifted by about 25 nanometers relative to that at the diameter of 25 nanometers. It is, therefore, confirmed that the field intensity is increased if the size is larger. The shift of the resonance wavelength and the increase of the field intensity also depend on the metal material and the material for the dielectric thin film 7. The increase of the field intensity means an increase of an electric dipole moment proportional to a volume of the Au fine sphere. Thus, the interaction between the Au fine spheres by the near-field light is intensified. Therefore, by changing the size of the metal fine structure 2, polarization control characteristics and an operating wavelength of the polarization control device 10 according to the first embodiment can be controlled. The Mie scattering is a strict solution of the Maxwell's equations while sphere boundary conditions are imposed on fine particles. In addition, the Mie scattering is a phenomenon that a progress direction of the light is changed without changing the wavelength of the light, i.e., the energy of the light.

From the calculation result, it is understood that the polarized state of the incident light, that is, an optical rotation angle and the phase difference between the two orthogonal directions can be controlled. The polarization control device such as an existing polarizer or a wavelength plate selects the plane of polarization in which a part of the polarized light is cut off by anisotropy of the absorption, and uses the birefringence by mirror image symmetry of crystals. Due to this, flexibility is low in selecting the material. In addition, to obtain a desired polarized state, the size of the polarization control device is made large. The polarization control device 10 according to the first embodiment, by contrast, can control polarization while controlling a phase delay according to arrangement of the metal fine structures 2 within the plane of the support substrate 1. The polarization control device 10 according to the first embodiment can, therefore, ensure high efficiency. In addition, thanks to use of the metal material, it is possible to provide the polarization control device 10 according to the first embodiment excellent in heat resistance and light resistance.

Furthermore, the local surface plasmon generated on the surface of the polarization control device 10 according to the first embodiment thus configured forms a near-field light near the surface of the device. This near-field light is locally scattered in a range equal to or smaller than the wavelength size. Due to this, by using the device as the near-field optical device, it is possible to measure and analyze the light at a resolution equal to or lower than the diffraction limit. By applying the device to the optical lithography, it is possible to perform finer patterning than conventional patterning. In the latter case, in particular, the device can be made sensitive to a light from a visible light source, which light does not react with a resist, due to an action produced by a non-adiabatic process of the near-field light. This can dispense with a short wavelength light source and an optical device corresponding to this light source. Therefore, a manufacturing cost can be advantageously reduced.

Figure 8:
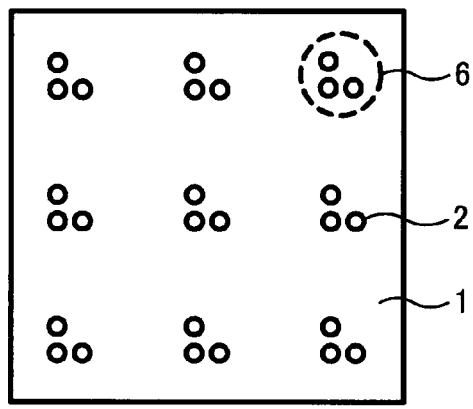
FIG. 8 is a plan view of a configuration of a polarization control device according to a second embodiment of the present invention.

FIG. 8 is a plan view of a configuration of a polarization control device 10 according to a second embodiment of the present invention. Similarly to the first embodiment, the polarization control device 10 according to the second embodiment has a structure of the periodic array of the metal compound structures 6. Each of the metal compound structures 6 is configured as follows. The metal fine structures 2 each at the size equal to or smaller than the diffraction limit of the incident light (about the wavelength of the incident light) are arranged adjacently in the range at the size equal to or smaller than the diffraction limit. The support substrate 1 used in the polarization control device 10 according to the second embodiment is the same as that explained in the first embodiment. If the transmission device is used as the polarization control device 10 according to the second embodiment, the support substrate 1 consisting of the transparent material such as quartz glass, borosilicate glass, or optical crystal material is used. If the reflecting device is used as the polarization control device 10 according to the second embodiment, the support substrate 1 consisting of a metal, a dielectric multilayer film or the like is used. If the polarization control device 10 according to the second embodiment uses both the transmitted light and the reflected light, the support substrate 1 consisting of a material coated with a Cr film or the like is used. In addition, the dielectric material coated on the metal fine structures 2 and the metal compound structures 6 can be used. According to the second embodiment, the polarization control device 10 according to the second embodiment and the polarization control method dependent on spatial arrangement of a plurality of metal fine structures 2 that constitute each metal compound structure 6 are provided.

The polarization control device 10 according to the second embodiment is characterized such that the metal compound structure 6 included in the device has a spatially asymmetric structure. In FIG. 8, each metal compound structure 2 is formed into an L-shaped structure in which the metal fine structures 2 are arranged on ends and bent portions of the L-shaped structure, respectively. As explained in the first embodiment, the metal material, e.g., Au, Ag, Pt, Al, or Cu, which can excite plasmon is used as the material for the metal fine structure 2. The metal fine structures 2 are periodically arranged on the support substrate 1. This structure is manufactured by the micro-fabrication technique such as the electron beam lithography, the DUV or EUV lithography, the nanoimprint lithography, or etching using change of the physical characteristics of the material. The shape of each metal fine structure 2 is not limited to a specific shape but can be a cylindrical shape, a semicircular shape or the like. The cylindrical or semicircular metal fine structure 2 can be easily manufactured. The metal compound structures 6 need to be present in the range small enough with respect to the diffraction limit of the incident light.

As shown in FIGS. 5A and 5B, if the two metal fine structures 2 are arranged adjacently to each other and the distance between the structures 2 is as small as about the size of the metal fine structure 2, the interaction between the two structures 2 by the near-field light acts depending on the distance. The amplitude ratio and the phase difference between the x and y directions are thereby changed. As shown in FIG. 8, by arranging pairs of metal fine structures 2 parallel to the x and y axes while controlling the distance between each pair of structures 2, the amplitude ratio and the phase difference between the x and y directions can be selected at a higher flexibility than that of the metal compound structure 6 constituted only by the two metal fine structures 2. Furthermore, in the polarization control device 10 according to the second embodiment, the interaction between the two metal fine structures 2 located on the respective ends of the L-shaped structure 6 by the near-field light in the oblique direction has an effect on the polarized state of the incident light. To control the bonding between the two metal fine structures 2 in the oblique direction, a length of a side of the L-shaped structure 6 or an angle between two sides of the L-shaped structure 6 can be adjusted.

Figure 9:
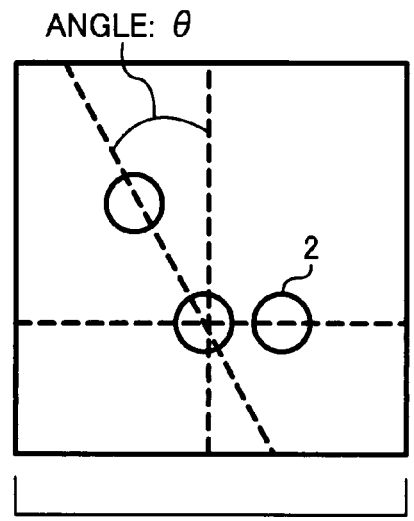
FIG. 9 is an explanatory view of the metal compound structure the two sides of which are changed outward by an angle θ.

FIG. 9 is an explanatory view of the metal compound structure 6 the two sides of which are changed outward by an angle θ. In this case, the interaction between the metal fine structures 2 by the near-field light in the oblique direction is lessened. As can be seen, by forming the three types of metal fine structure pairs using the three metal fine structures 2, and constituting the metal compound structure 6 while controlling the distances among the structures, it is possible to provide the polarization control device 10 according to the second embodiment capable of controlling the polarized state of the incident light with high flexibility.

Figure 10A:
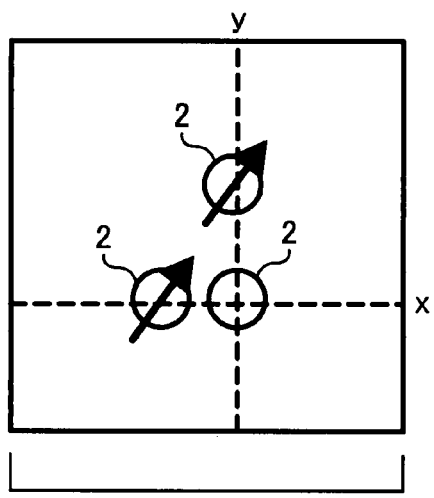
FIG. 10A is an explanatory view of an arrangement (right-hand arrangement) of the metal compound structure.
Figure 10B:
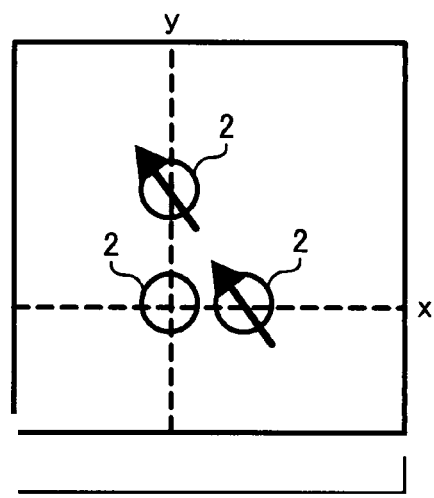
FIG. 10B is an explanatory view of an arrangement (left-hand arrangement) of the metal compound structure.

Furthermore, as shown in FIGS. 10A and 10B, as for the oblique coupling, two types of coupling in which the two metal fine structures 2 having a mirror symmetrical relationship are arranged are known. The arrangement shown in FIG. 10A will be referred to as "right-hand arrangement" and that shown in FIG. 10B will be referred to as "left-hand arrangement" to distinguish them from each other. In FIGS. 10A and 10B, an arrow indicates a coupled component by a longitudinal wave of the plasmon in the paired metal fine structures 2 coupled obliquely to each other. The left-hand arrangement and the right-hand arrangement differ in that directions of the x-direction component of the plasmon vibration are inverted relative to each other. This means that the components shifted in the phase of the x direction by 180 degrees with respect to each other are present in the left-hand arrangement and the right-hand arrangement, respectively. Using this fact, the polarized state in which the linearly polarized light is transformed into a clockwise polarized light or a counterclockwise polarized light can be controlled.

The principle of this polarization control is the use of the coupling direction of the plasmon excited in the metal fine structures 2 by the near-field light, that is, the use of anisotropy of longitudinal wave and transverse wave components of the plasmon. Accordingly, the number of metal fine structures 2 that constitute each metal compound structure 6 is not limited to three. It suffices that the metal compound structure 6 can be configured so that a plurality of metal fine structures 2 are arranged in the range equal to or smaller than the wavelength of the light.

Since the resonance of the plasmon generated in the metal is used, the polarization control device 10 according to the second embodiment depends on the wavelength of the light. As explained in the first embodiment with reference to FIG. 7, the operating wavelength of the polarization control device 10 according to the second embodiment can be controlled according to the size of the metal fine structure 2. In addition, as explained with reference to FIG. 6, the operating wavelength can be controlled by forming the dielectric thin film 7 coated on the metal fine structures 2 and the metal compound structures 6.

As can be understood, by using a plurality of metal fine structures 2 and the spatially asymmetric arrangement of the metal fine structures 2, the polarization control device 10 according to the second embodiment having a high flexibility in polarization selection can be realized.

Figure 11:
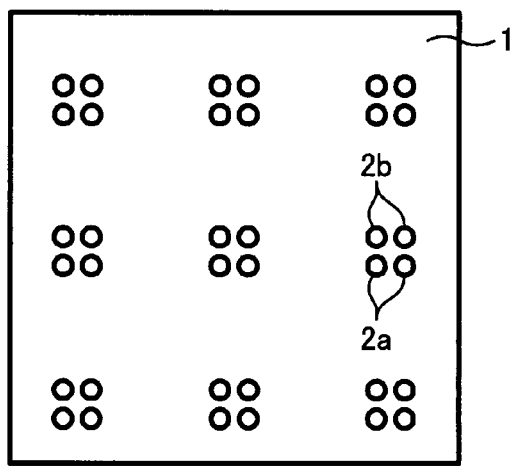
FIG. 11 is an explanatory view of a configuration of a polarization control device according to a third embodiment of the present invention.

FIG. 11 is an explanatory view of a configuration of a polarization control device 10 according to a third embodiment of the present invention. Similarly to the first embodiment, the polarization control device 10 according to the third embodiment has the periodic array of the metal compound structures 6. Each of the metal compound structures 6 is configured as follows. The metal fine structures 2 each at the size equal to or smaller than the diffraction limit of the incident light (about the wavelength of the incident light) are arranged adjacently in the range at the size equal to or smaller than the diffraction limit. The support substrate 1 used in the polarization control device 10 according to the third embodiment is the same as that explained in the first embodiment. If the transmission device is used as the polarization control device 10 according to the third embodiment, the support substrate 1 consisting of the transparent material such as quartz glass, borosilicate glass, or optical crystal material is used. If the reflecting device is used as the polarization control device 10 according to the third embodiment, the support substrate 1 consisting of a metal, a dielectric multilayer film or the like is used. In addition, the dielectric material coated on the metal fine structures 2 and the metal compound structures 6 can be used.

The polarization control device 10 according to the third embodiment is characterized such that each metal compound structure 6 included in the device consists of two or more different metal materials. The polarization control device 10 according to the third embodiment includes the metal compound structures 6 each constituted by a pair of metal fine structures 2 each consisting of a metal material 2a and a pair of metal fine structures 2 each consisting of a metal material 2b different from the metal material 2a. FIG. 11 depicts that the metal fine structure pairs consisting of the metal materials 2a and 2b, respectively are arranged in parallel. It suffices that the metal fine structure pair consisting of the same metal material is present in the range at the size equal to or smaller than the wavelength of the incident light.

As explained in the first embodiment, the metal compound structure 6 having this structure can be realized by a combination of metal materials that can excite plasmon such as Au, Ag, Pt, Al, and Cu. The metal compound structure 6 can be manufactured using the micro-fabrication technique such as the electron beam lithography, the DUV or EUV lithography, the nanoimprint lithography, or etching using change of the physical characteristics of the material. The shape of each metal fine structure 2 is not limited to a specific shape but can be a cylindrical shape, a semicircular shape or the like. The cylindrical or semicircular metal fine structure 2 can be easily manufactured.

As shown in FIGS. 5A and 5B, if the two metal fine structures 2 consisting of the same metal material are arranged to be adjacent to each other, anisotropy appears between the plasmon vibrations in the x direction and the y direction. An intensity of the interaction between the two structures 2 by the near-field light is changed, largely depending on the plasmon resonance wavelength of the metal material. Due to this, the amplitude ratio and the phase difference between the x-direction component and the y-direction component of the field relative to the distance between the two metal fine structures 2 differ according to the type of the metal material. In addition, the interaction between the different metal materials by the near-field light is weak and the anisotropy of the plasmon vibrations is not conspicuous if the metal materials have plasmon resonance wavelengths apart from each other. Therefore, the interaction in this case is negligible. Accordingly, by arranging pairs of metal fine structures 2 consisting of the same metal material and pairs of metal fine structures 2 consisting of the different metal materials while adjusting the distance between the respective two pairs, it is possible to control the polarized state of the incident light in diverse manners. In addition, it is possible to set a range of the operating wavelength of the polarization control device 10 according to the third embodiment.

As can be understood, by constituting the metal compound structure 6 so that the metal fine structures 2 consisting of different metal materials are arranged to form pairs of the same metal materials in the range equal to or smaller than the wavelength of the incident light, it is possible to control the polarization characteristics of the polarization control device 10 according to the third embodiment with high flexibility. In addition, it is possible to select a wide range of the operating wavelength of the polarization control device 10 according to the third embodiment by combinations of the metal materials.

Figure 12:
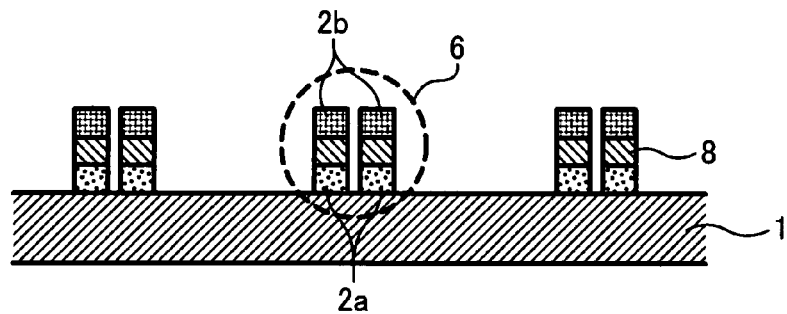
FIG. 12 is an explanatory view of a configuration of a polarization control device according to a fourth embodiment of the present invention.

FIG. 12 is a cross-sectional view of a configuration of a polarization control device 10 according to a fourth embodiment of the present invention. The polarization control device 10 according to the fourth embodiment is configured as follows. As a metal fine structure at the size equal to or smaller than the diffraction limit of the incident light (about the wavelength of the incident light), the meal material 2a, a dielectric material 8, and the metal material 2b are layered in this order. In addition, the metal compound structures 6 each configured so that two metal fine structures are arranged to be adjacent to each other in the range equal to or smaller than the diffraction limit of the incident light are periodically arranged. Each metal compound structure 6 consists of two or more different metal materials. The support substrate 1 used in the polarization control device 10 according to the fourth embodiment is the same as that explained in the first embodiment. If the transmission device is used as the polarization control device 10 according to the fourth embodiment, the support substrate 1 consisting of the transparent material such as quartz glass, borosilicate glass, or optical crystal material is used. If the reflecting device is used as the polarization control device 10 according to the fourth embodiment, the support substrate 1 consisting of a metal, a dielectric multilayer film or the like is used. In addition, the dielectric material coated on the metal fine structures 2 and the metal compound structures 6 can be used.

The polarization control device 10 according to the fourth embodiment is characterized such that the polarization control device using the two or more metal materials as explained in the third embodiment is realized by a multilayer structure. The use of the different metal materials in the same plane sometimes adversely influences machining accuracy due to a positioning problem or the like. However, for the polarization control device 10 according to the fourth embodiment including the metal compound structures 6 each consisting of the different metal materials, it suffices that pairs of the same metal materials are formed. It is not always necessary that the metal fine structures are present in the same plane on the support substrate 1. Accordingly, it is preferable to constitute the metal compound structures 6 each having the multilayer structure shown in FIG. 12 since it is easier to manufacture the polarization control device 10 according to the fourth embodiment.

As explained in the first embodiment, the metal compound structure 6 having this structure can be realized by a combination of metal materials that can excite the plasmon such as Au, Ag, Pt, Al, and Cu. The metal material 2a, the dielectric material 8, and the metal material 2b are layered in this order by sputtering. Thereafter, peripheries of the metal fine structure are etched away by such a method as the electron beam lithography, or the DUV or EUV lithography. Alternatively, after layering the metal material 2a, the dielectric material 8, and the metal material 2b in this order, the light is further irradiated on the metal fine structure. In addition, the phase-change material or the transition metal oxide material the physical characteristics of which is changed by irradiating the material with a light and the etch rate of which is changed is used to form a layer on the resultant metal fine structure 2. After optical patterning, peripheries of the metal fine structure 2 are etched away. In this alternative, the phase-change material layer or the transition metal oxide material layer remains as an uppermost layer. Since the uppermost layer has an effect of changing the plasmon resonance wavelength, it is necessary to select, as the material for this layer, one suited for the wavelength of the light to be used.

An operation principle of the polarization control device 10 according to the fourth embodiment is the same as that explained in the third embodiment. Thanks to the interaction between the different metal materials by the near-field light, it is possible to obtain the anisotropy of the plasmon vibration between the x direction and the y direction in diverse manners, and control the polarized state of the incident light. In addition, it is possible to set the range of the operating wavelength of the polarization control device 10 according to the fourth embodiment.

Figure 13:
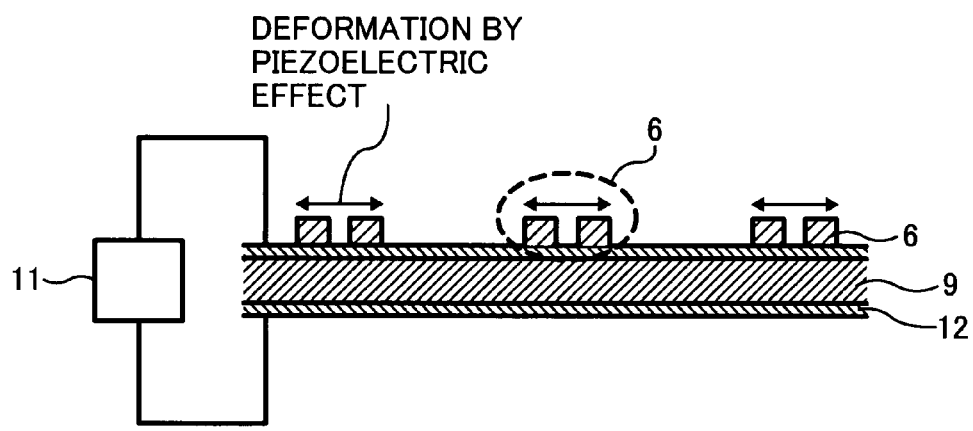
FIG. 13 is a cross-sectional view of a configuration of a polarization control device according to a fifth embodiment of the present invention.

A polarization control device 10 and a polarization control method according to a fifth embodiment of the present invention will be explained with reference to FIG. 13. The polarization control device 10 according to the fifth embodiment fetches and uses an incident polarization state as a polarization-controlled emission light by the interaction between the metal compound structures included in the device and the light, and is characterized by electrically changing relative positions of the metal fine structures 2 that constitute each metal compound structure 6 and by actively modulating the incident polarization state. FIG. 13 is a cross-sectional view of a configuration of the polarization control device. The polarization control device 10 according to the fifth embodiment includes a piezoelectric substrate 9 consisting of a piezoelectric material, and includes a voltage control mechanism 11 and electrodes 12 for deforming the piezoelectric substrate 9 by a very small amount using a piezoelectric effect. The metal fine structure 2 and the metal compound structure 6 can be the same as those explained in the first embodiment. Namely, the metal compound structure 6 can be configured so that two metal fine structures 2 are arranged adjacently while controlling the distance therebetween. Alternatively, the metal compound structure 6 can be configured so that the metal fine structures 2 are arranged asymmetrically spatially as explained in the second embodiment. Alternatively, the structure 6 can be configured so that the metal fine structures 2 consisting of two or a plurality of metal materials are arranged as explained in the third and the fourth embodiments.

As explained in the first embodiment, the metal fine structure 2 can be realized by a combination of metal materials, e.g., Au, Ag, Pt, Al, and Cu, which can excite plasmon. The structure 2 can be manufactured using the micro-fabrication technique such as the electron beam lithography, the DUV or EUV lithography, the nanoimprint lithography, or etching using change of the physical characteristics of the material. The shape of each metal fine structure 2 is not limited to a specific shape but can be a cylindrical shape, a semicircular shape or the like. The cylindrical or semicircular metal fine structure 2 can be easily manufactured. The metal compound structures 6 need to be present in the range small enough with respect to the diffraction limit of the incident light. To protect the metal fine structures 2 and the metal compound structures 6, and to adjust the plasmon resonance wavelength, the dielectric thin film 7 can be arranged as the uppermost layer.

The piezoelectric substrate 9 can consist of the piezoelectric material deformed when a voltage is applied thereto. Examples of this piezoelectric material include single-crystal materials such as quartz crystal, LiNbO$_3$, and KNbO$_3$. Alternatively, the piezoelectric substrate 9 can be a thin film consisting of ZnO, AlN or the like formed on a dielectric substrate material, a piezoelectric polymer thin film consisting of piezoelectric ceramics obtained by polarizing a sintered compact containing PbZrO$_3$, PbTiO$_3$ or the like, polyvinylidene fluoride or the like. To uniformly apply the voltage to such a substrate, the electrodes 12 are provided on and under the piezoelectric substrate 9, respectively, and the voltage control mechanism 11 is provided exteriorly of the piezoelectric substrate 9. As an electrode material, an indium tin oxide (ITO) or the like is used for transparent electrodes if the polarization control device 10 according to the fifth embodiment is used as a transmission polarization control device. If the device is used as a reflecting polarization control device, the electrode material can be an ordinary metal material. If the voltage is applied to the piezoelectric substrate 9 thus configured, the piezoelectric substrate 9 is deformed in a direction perpendicular to a voltage application direction. If so, the distance between the metal fine structures 2 that constitute the metal compound structure 6 is modulated, thereby controlling the polarized state of the incident light. While a deformation amount of the piezoelectric substrate 9 depends on the configuration of the metal compound structure 6, it can be about the size of each metal fine structure 2, i.e., about 10 nanometers to 100 nanometers.

An operating wavelength of the polarization control device 10 according to the fifth embodiment can be adjusted by the metal material for the metal fine structures 2, the size of the device, and the dielectric thin film. It can be also controlled by the distance between the metal fine structures 2 by application of the voltage.

As can be understood, the polarization control device 10 according to the fifth embodiment can actively modulate the polarized state of the incident light by the external voltage. The polarization control device having variable polarization control characteristics can be realized. Such a polarization control device can be applied to an optical signal processing in information communication.

Figure 14:
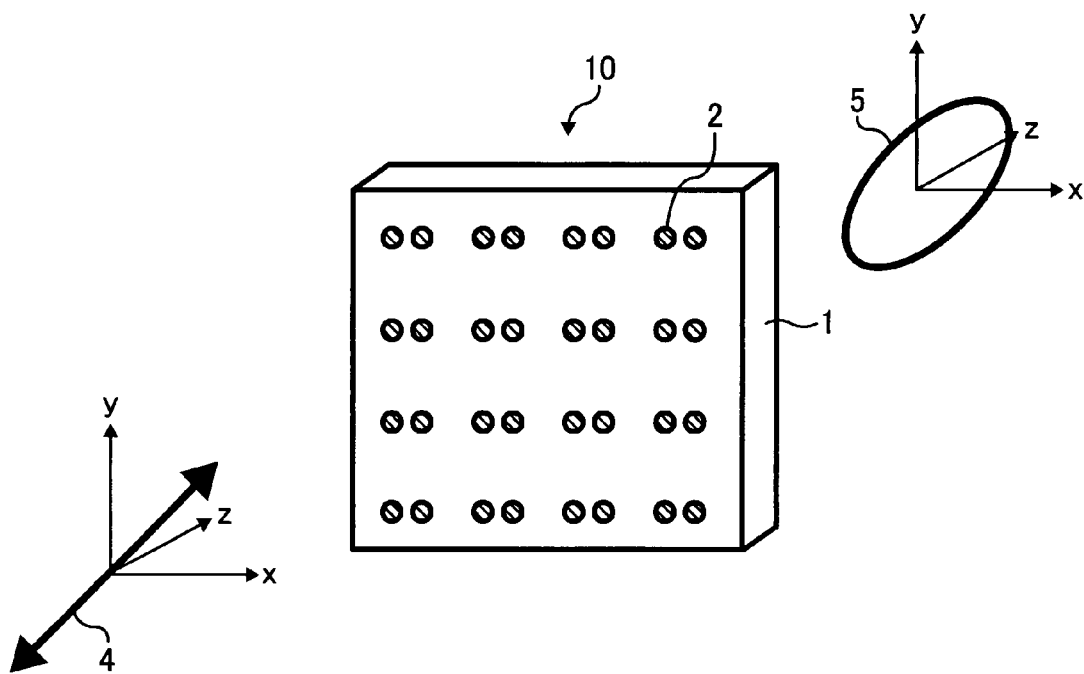
FIG. 14 is an explanatory view of a function of a polarization control device according to a sixth embodiment of the present invention.

FIG. 14 is an explanatory view of a function of a polarization control device 10 according to a sixth embodiment of the present invention. As shown in FIG. 14, the polarization control device 10 according to the fifth embodiment is configured so that the metal fine structures 2 are formed on the support substrate 1 such as an optically flat glass substrate. A light is irradiated on the support substrate 1 on which such a metal fine structure pattern is formed. If the metal fine structures 2 are present asymmetrically with respect to the incident polarized light, a phase difference is generated between the two adjacent metal fine structures 2 by the near-field interaction generated between the structures 2 to depend on the resonance frequency of the local surface plasmon generated in each structure 2. Due to this, a phase difference is also generated between the two polarized components of the reflected light or transmitted light obtained by superimposing lights from the respective structures 2. The polarized state of the emission light is transformed, accordingly.

Namely, if the linearly polarized light 4 inclined at 45 degrees with respect to a Y-axis direction is incident on the support substrate 1, the light transmitted by the support substrate 1 is transformed into the elliptically polarized light 5. While the metal fine structure 2 is circular in this embodiment, it may not be circular but can be, for example, elliptic or polygonal. Alternatively, the metal fine structure 2 can be configured so that circular structures are arranged continuously so as to form a pseudo-elliptic structure. Furthermore, if the light is incident on the support substrate 1 so that the light contains asymmetric components with respect to the structures 2 thus formed, the phase difference is generated between the structures 2.

The material for these metal fine structures 2 can be selected so as to generate plasmon at the wavelength of the light source to be used and to give a desired phase difference to the emission light. Examples of the material include Au, Ag, Al, Pt, Ni, Cr, and Cu as well as alloys thereof. The material is particularly preferably Au, Ag, or Al. The plasmon is a collective movement of electrons excited in the metal.

Figure 15:
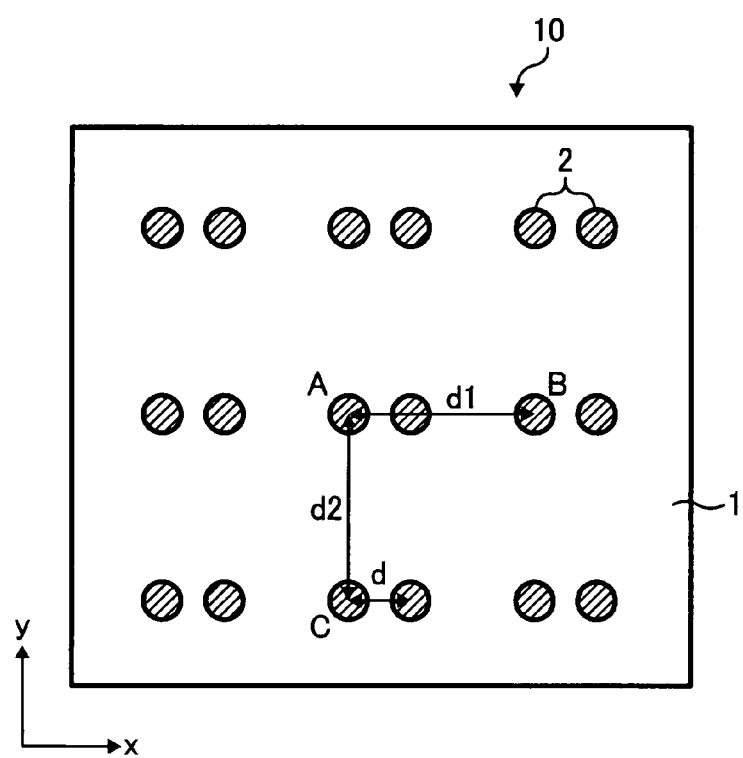
FIG. 15 is an explanatory view of a magnitude of each metal fine structure that constitutes the polarization control device, a distance relationship among the metal fine structures, and the like according to the sixth embodiment.

As shown in FIG. 15, it is assumed herein that a magnitude (a diameter) of each metal fine structure 2 is R, a distance between centers of two most adjacent metal fine structures 2 in the x direction is d. A combination of the two adjacent metal fine structures 2 in the x direction is A, and a combination of the metal fine structures 2 most adjacent to the combination A in the x direction is B. A distance between the combinations A and B is d1. A combination of the metal fine structures 2 most adjacent to the combination A in the y direction is C, and a distance between the combinations A and C is d2. If so, it is desirable that each of R, d1, and d2 is smaller than the wavelength of the incident light. To use the near-field interaction generated between the two adjacent metal fine structures 2, it is necessary that the central distance d satisfies at least d<R. To lessen the influence of the interaction between the adjacent combinations of the metal fine structures 2, it is necessary that the distances d1 and d2 are larger than R.

Figure 16:
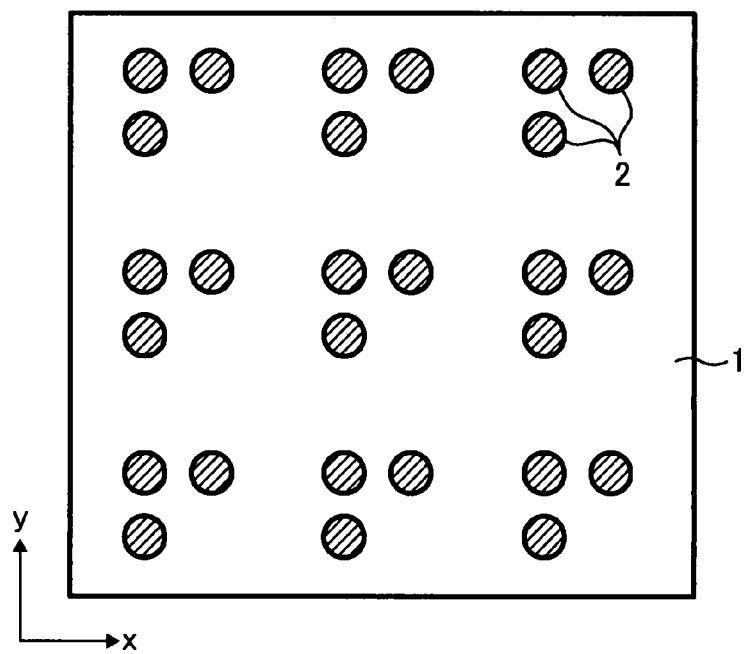
FIG. 16 is an explanatory view of an array pattern example (1) of the metal fine structures that constitute the polarization control device according to the sixth embodiment.
Figure 17:
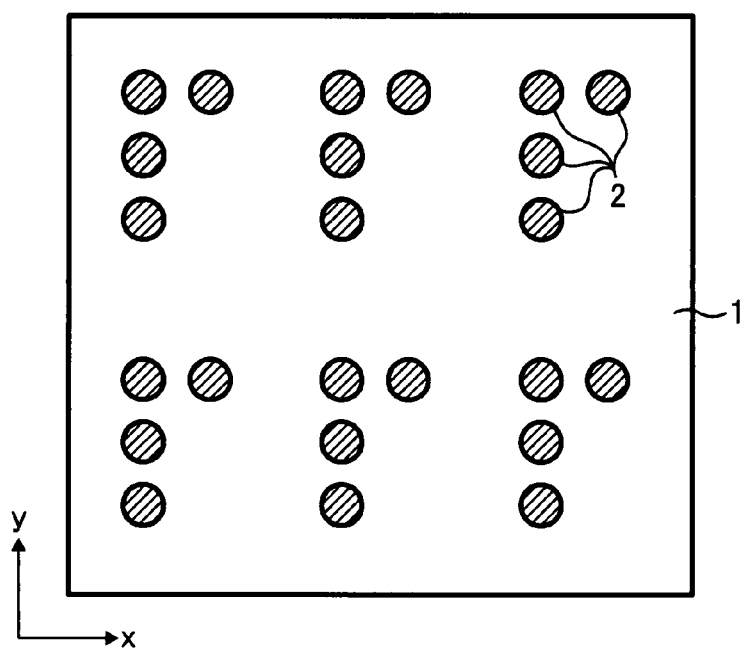
FIG. 17 is an explanatory view of an array pattern example (2) of the metal fine structures that constitute the polarization control device according to the sixth embodiment.

As shown in FIG. 16, an L-shaped or a V-shaped metal compound structure 6 can be formed by a combination of three or a plurality of metal fine structures 2. In the example of FIG. 16, similarly to the configuration shown in FIG. 15, it is preferable that the distance between the two adjacent metal fine structures 2, is sufficiently smaller than the magnitude of each metal fine structure 2. In the example of FIG. 17, it is preferable that the distance between the two L-shaped or V-shaped structures 6 is sufficiently larger than the magnitude of each metal fine structure 2 that constitutes the L-shaped or V-shaped structure 6. Similarly to the above, if the light is incident on the support substrate 1 at an angle at which the light contains asymmetric polarized light components with respect to the metal fine structures 2 thus formed, a phase difference is generated between the two polarized light components of the transmitted or reflected light is generated between the two polarized light components of the transmitted or reflected light.

Figure 18:
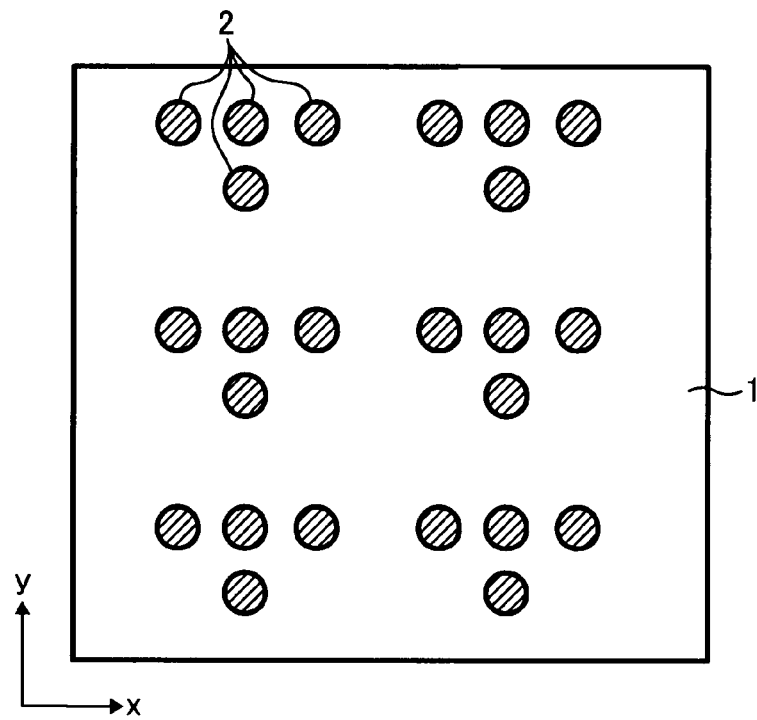
FIG. 18 is an explanatory view of an array pattern example (3) of the metal fine structures that constitute the polarization control device according to the sixth embodiment.

A T-shaped metal compound structure 6 can be formed by a combination of three metal fine structures 2 as shown in FIG. 17 or by a combination of a plurality of metal fine structures 2 as shown in FIG. 18. Similarly to the configuration shown in FIG. 15, it is preferable that the distance between the two adjacent metal fine structures 2 is sufficiently smaller than the magnitude of each metal fine structure 2. In addition, it is preferable that the distance between the two T structures 6 is sufficiently larger than the magnitude of each metal fine structure 2. Similarly to the above, if the light is incident on the support substrate 1 at an angle at which the light contains asymmetric components with respect to the metal fine structures 2 thus formed, a phase difference is generated between the two polarized light components of the transmitted or reflected light.

Figure 19:
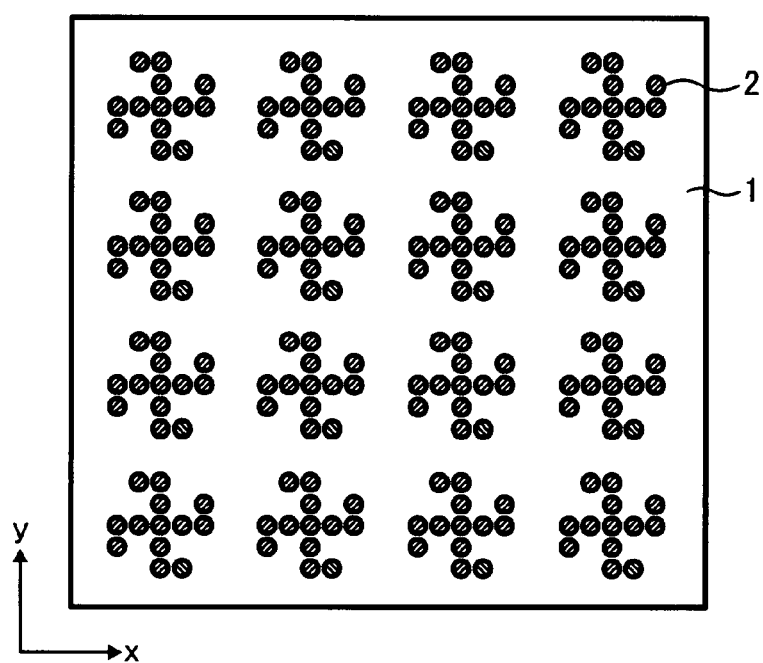
FIG. 19 is an explanatory view of an array pattern example (4) of the metal fine structures that constitute the polarization control device according to the sixth embodiment.

A swastika-shaped metal compound structure 6 can be formed by a combination of three metal fine structures 2 as shown in FIG. 18 or by a combination of a plurality of metal fine structures 2 shown in FIG. 19. A metal compound structure 6 symmetric to that shown in FIG. 18 can be formed similarly. Similarly to the configuration shown in FIG. 15, it is preferable that the distance between the two adjacent metal fine structures 2 is sufficiently smaller than the magnitude of each metal fine structure 2. In addition, it is preferable that the distance between the two T-shaped structures is sufficiently larger than the magnitude of each metal fine structure 2. If the light is incident on the support substrate 1 at an angle at which the light contains asymmetric components with respect to the metal fine structures 2 thus formed, a phase difference is generated between the two polarized light components of the transmitted or reflected light.

The polarization control device 10 according to the fifth embodiment can be manufactured as follows. A substrate consisting of optical glass as the inorganic material is formed. A metal thin film is formed on a flat surface of the optical glass substrate by depositing thereon the metal material, such as Au, Ag, and Al, by a film forming method using chemical vapor deposition (CVD) or physical vapor deposition (PVD) or by a deposition method such as plating. A photoresist layer is formed on this metal thin film. A resist pattern is formed on the photoresist layer so as to leave a pattern corresponding to desired fine structures by such a method as electron beam lithography or X-ray lithography. Thereafter, unnecessary parts of the metal thin film are etched away by, for example, reactive-ion etching (RIE). The desired metal fine structure pattern can be thereby formed.

Alternatively, the substrate consisting of optical glass as the inorganic material is formed. A photoresist layer is formed on the flat surface of the optical glass substrate. A resist pattern is formed on this photoresist layer so as to leave parts other than the pattern corresponding to the desired fine structures by such a method as the electron beam lithography or the X-ray lithography. Thereafter, a metal thin film is formed on the resist pattern by depositing the metal material, such as Au, Ag, and Al, by the film forming method using the CVD or the PVD or by the deposition method such as plating. Thereafter, the resist film is removed to thereby remove unnecessary parts of the metal film formed on the resist film. The desired metal fine structure pattern can be thereby formed.

Examples of the inorganic material for the glass substrate include quartz glass, borosilicate glass such as $BK_7$ and Pyrex, and optical crystal materials such as $CaF_2$, Si, ZnSe, and $Al_2O_3$. If the reflecting device is used as the polarization control device 10 according to the fifth embodiment, the support substrate 1 preferably consists of a material having a high reflectance. Examples of this material include optical glasses and optical crystal materials each coated with a metal film such as an Al film or an Au film. Alternatively, the polarization control device 10 according to the fifth embodiment can be used as a half mirror using both of the transmitted light and the reflected light, by using the support substrate 1 consisting of a material coated with a Cr film, as a partially reflecting film.

Figure 20:
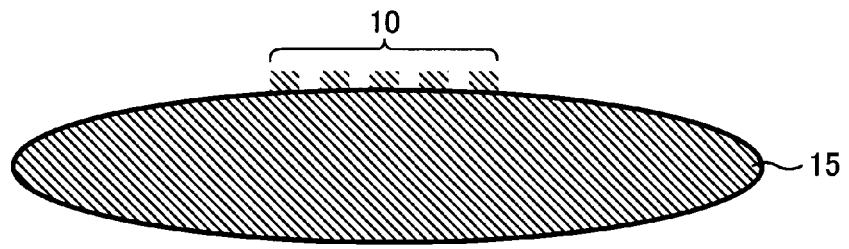
FIG. 20 is an explanatory view of an example of forming the polarization control device according to the sixth embodiment on a lens.

As shown in FIG. 20, for example, by integrally forming functions of the polarization control device 10 according to the fifth embodiment, i.e., the metal fine structures on a lens, optical functions constituted separately by the wavelength plate and the lens are realized only by the lens 15. Therefore, a space saving can be realized and optical adjustment and the like can be simplified.

Figure 21:
FIG. 21 is an explanatory view of an example of forming the polarization control device according to the sixth embodiment on a micro-lens array optical device.

As shown in FIG. 21, if the functions of the polarization control device 10 according to the fifth embodiment, i.e., a metal particle pattern thereof are formed on a micro-lens array optical device 16, the optical functions that are conventionally constituted separately by the wavelength plate and the micro-lens array can be realized only by the micro-lens array 7. A space saving can be realized and optical adjustment and the like can be simplified.

The local surface plasmon generated on a surface of the optical device thus configured is also referred to as "near-field light", which is locally scattered in the range equal to or smaller than the wavelength of the light. Due to this, by using the device as the near-field optical device, it is possible to measure and analyze the light at a resolution equal to or lower than the diffraction limit. By applying the device to the optical lithography, it is possible to perform finer patterning than conventional patterning. In the latter case, in particular, the device can be made sensitive to a light from a visible light source, which light does not react with a resist, due to an action produced by a non-adiabatic process of the near-field light. This can dispense with a short wavelength light source and an optical device corresponding to this light source. Therefore, a manufacturing cost can be advantageously reduced.

As can be understood, according to this embodiment, minimum constituent units each constituted by the two metal fine structures 2 are formed in a two-dimensional array on the support substrate 1, thereby providing the structure having a high flexibility in design and consisting of the metal. It is, therefore, advantageously possible to provide the polarization control device excellent in heat resistance and light resistance.

The polarization control device according to this embodiment is suitable for optical measurement, optical communication, optical recording, and the like. The polarization control device is particularly suitably used in any one of the liquid crystal display, the EL display, and various optical apparatuses for preventing widening of the angle of view and reducing the reflected light by disturbance.

In a seventh embodiment of the present invention, metal particle patterns each consisting of two or more metals or alloys are continuously formed on a dielectric substrate. Using the difference in the plasmon resonance wavelength of the light among the metals, a phase difference is generated in the transmitted light or reflected light, and the function of the wavelength plate is realized. By using metal particles, the polarization control device superior in heat resistance than the organic multilayer film is provided.

Figure 22:
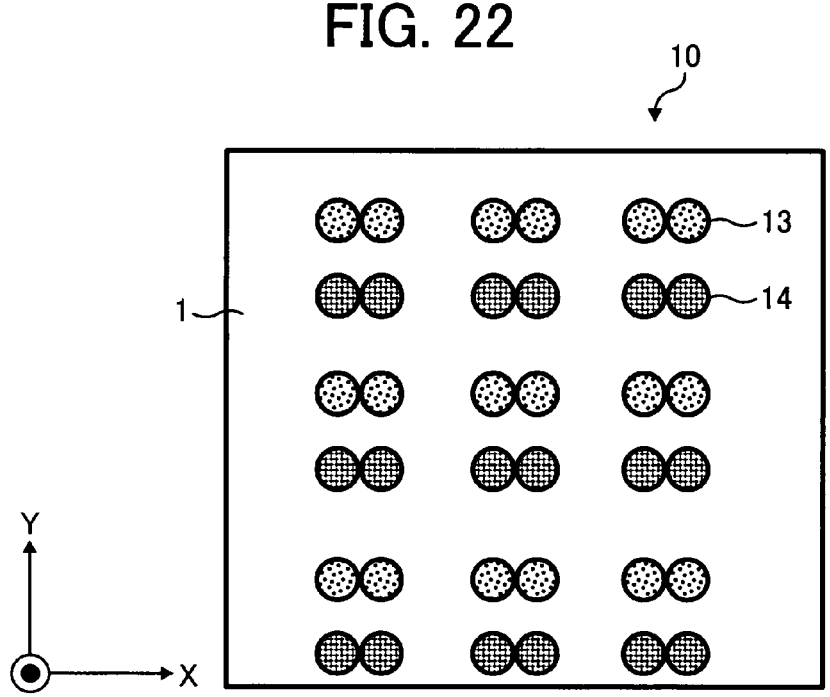
FIG. 22 is an explanatory view of a configuration of a polarization control device according to a seventh embodiment of the present invention.

FIG. 22 is an explanatory view of a configuration of a polarization control device 10 according to the seventh embodiment. In FIG. 22, reference numeral 1 denotes the support substrate, which is the dielectric substrate consisting of a transparent material such as glass. Reference numeral 13 denotes a first metal particle, and reference numeral 14 denotes a second metal particle different from the first metal particle 13. As shown in FIG. 22, the polarization control device 10 according to the seventh embodiment is configured so that the first metal particles 13 and the second metal particles 14 are arranged on the support substrate 1 by predetermined periodicity. The first metal particle 13 and the second metal particle 14 are formed by combining, for example, processes of the electron beam lithography (EB) or photolithography and sputter etching.

Figure 23:
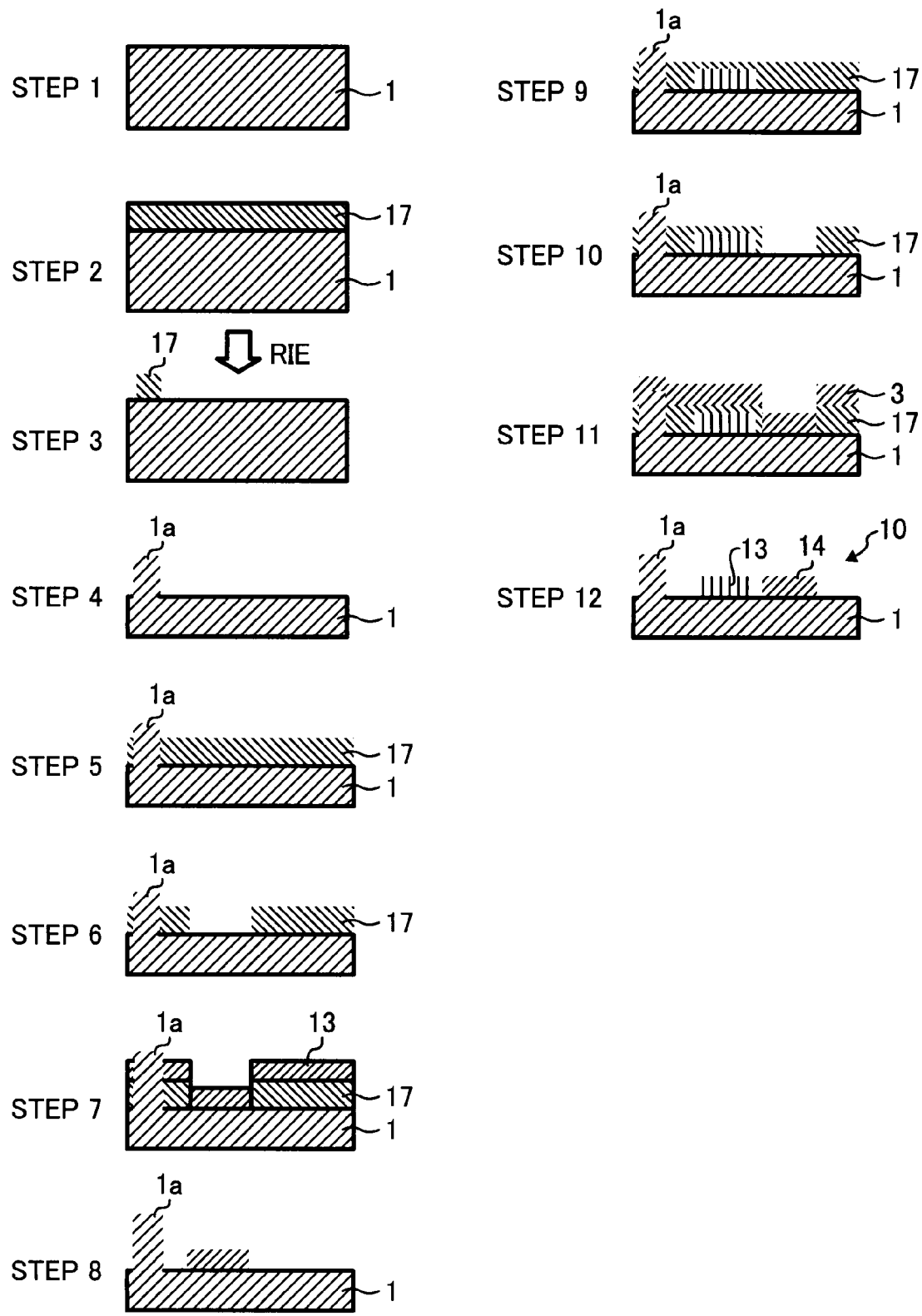
FIG. 23 is an explanatory view of a process of manufacturing the polarization control device according to the seventh embodiment.

A manufacturing process of the polarization control device 10 according to the seventh embodiment will be explained with reference to FIG. 23. The support substrate 1 consisting of the transparent material such as glass is prepared (at step 1), and a resist 17 is coated on the support substrate 1 by spin coating or the like (at step 2). The resist 17 is exposed and rinsed so as to leave a part of the resist 17 by the EB or the like (at step 3). Thereafter, etching such as RIE is performed so that a part of the support substrate 1 has a convex shape 1a (at step 4). The convex shape 1a serves as a reference mark for later processes. The resist 17 is coated again on the support substrate 1 having this reference mark (at step 5). The resist 17 is exposed and rinsed with this reference mark as a reference position so as to remove a part of the resist in which the first metal particle 13 is to be formed (at step 6). A film of the first metal particle 13 is formed on the support substrate 1 by a process such as sputtering or deposition (at step 7). The metal other than the desired metal particle is removed by liftoff accompanying removal of the resist 17 (at step 8). The resist 17 is coated again on the support substrate 1 by such a thickness that the convex shape 1a is not hidden by the resist 17 (at step 9). Using the reference mark as the reference position again, the resist 17 is exposed and rinsed by the EB so that a part of the resist 17 in which the second metal particle 14 is to be formed is removed (at step 10). Thereafter, a film of the second metal particle 14 is formed similarly to the step 7 (at step 11). Unnecessary metal other than the desired metal particle is removed by liftoff, thereby completing the polarization control device 10 according to the seventh embodiment having a desired pattern (at step 12).

In this process, the two types of metal particles are used to form the desired pattern. If three or more types of metal particles are used to form the desired pattern, the steps 9 to 12 are repeatedly executed.

The materials for the metal particles 13 and 14 are selected according to the wavelength of the light source to be used and a desired phase compensation function. Examples of the materials include metal materials such as Au, Ag, Al, Pt, Ni, Cr, Cu, and Fe as well as alloys thereof.

If a light is irradiated onto the support substrate 1 on which the first metal particles 13 and the second metal particles 14 are thus formed, the amplitude ratio and phase difference are generated on the electric field to depend on resonance frequencies of the local surface plasmons of the respective metal particles. Due to this, the phase difference is also generated between the polarized components of the reflected light or transmitted light obtained by superimposing the lights from the respective metal particles. The polarized state is thereby transformed. The plasmon is a collective movement of electrons excited in the metal.

Figure 24:
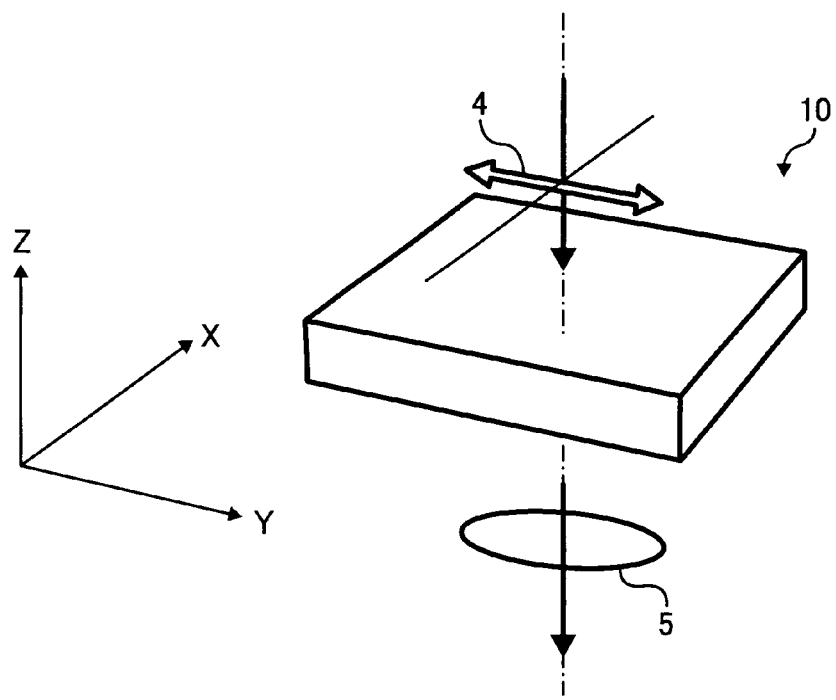
FIG. 24 is an explanatory view of a polarized state by the polarization control device according to the seventh embodiment.

Namely, as shown in FIG. 24, if the linearly polarized light 4 in the Y-axis direction, for example, is incident on the polarization control device 10 according to the seventh embodiment that includes the support substrate 1 on which the first metal particles 13 and the second metal particles 14 are formed, the light passing through the polarization control device 10 according to the seventh embodiment is transformed into the elliptically polarized light 5.

The local surface plasmon generated on the surface of the optical device thus configured (polarization control device 10 according to the seventh embodiment) is also referred to as "near-field light", which is locally scattered in the range equal to or smaller than the wavelength of the incident light. Due to this, by using the device as the near-field optical device, it is possible to measure and analyze the light at a resolution equal to or lower than the diffraction limit. By applying the device to the optical lithography, it is possible to perform finer patterning than conventional patterning. In the latter case, in particular, the device can be made sensitive to a light from a visible light source, which light does not react with a resist, due to an action produced by a non-adiabatic process of the near-field light. This can dispense with a short wavelength light source and an optical device corresponding to this light source. Therefore, a manufacturing cost can be advantageously reduced. Besides, the device can be applied to machining methods other than optical lithography. Examples of the other machining methods include optical CVD and self-organization of a nanostructure.

The near-field light is a light adhering to a surface of an object. The near-field light has characteristics that if the light is farther from the object, an intensity of the light is exponentially reduced, and that the light spreads only by about 100 nanometers from the surface of the object. The surface plasmon light is a light that is propagated only on the surface of the object. The local plasmon light is a light present in local regions of very small particles or pointed local regions.

Figure 25:
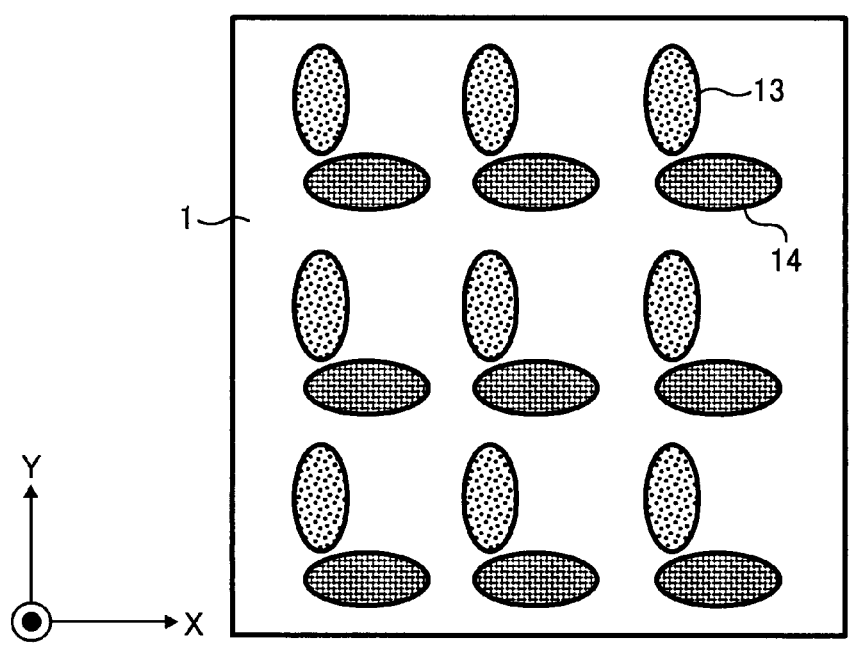
FIG. 25 is an explanatory view of an example of an L-shaped arrangement of metal particles in the polarization control device according to the seventh embodiment.

In this embodiment, the first metal particles 13 and the metal particles 14 are arranged in a parallel pattern as shown in FIG. 22. Alternatively, the particles 13 and 14 can be arranged differently. For instance, as shown in FIG. 25, the first metal particles 13 and the second metal particles 14 different from the first metal particles 13 are arranged into an L-shaped pattern. Namely, the first metal particle 13 and the second metal particle 14 are formed into an L shape as shown in FIG. 25. By so arranging, the changes in the amplitude ratio and the phase difference on the electric field generated between the metal particles due to anisotropy between the X direction and the Y direction are greater. A flexibility in design of the polarized state is higher. Namely, by providing the metal particles with L-shaped anisotropy, the amplitude ratio and the phase difference on the electric field generated in the metal particles can be made greater. The phase difference between the polarized light components of the transmitted light or the reflected light can be made greater. The polarization control device having a high flexibility in design of the polarized state can be, therefore, provided.

In FIG. 25, the metal particles are elliptical. Alternatively, each metal particle can be configured so that circular particles are arranged continuously so as to form a pseudo-elliptic structure. The shape of the particle that forms the pseudo-ellipse can be other than the circular shape and can be, for example, a semicircular shape or a polygonal shape. As long as the metal particles are anisotropic, the pattern can be other than the L-shaped pattern and can be, for example, a T-shaped pattern, a V-shaped pattern, or a swastika-shaped pattern.

Figure 26A:
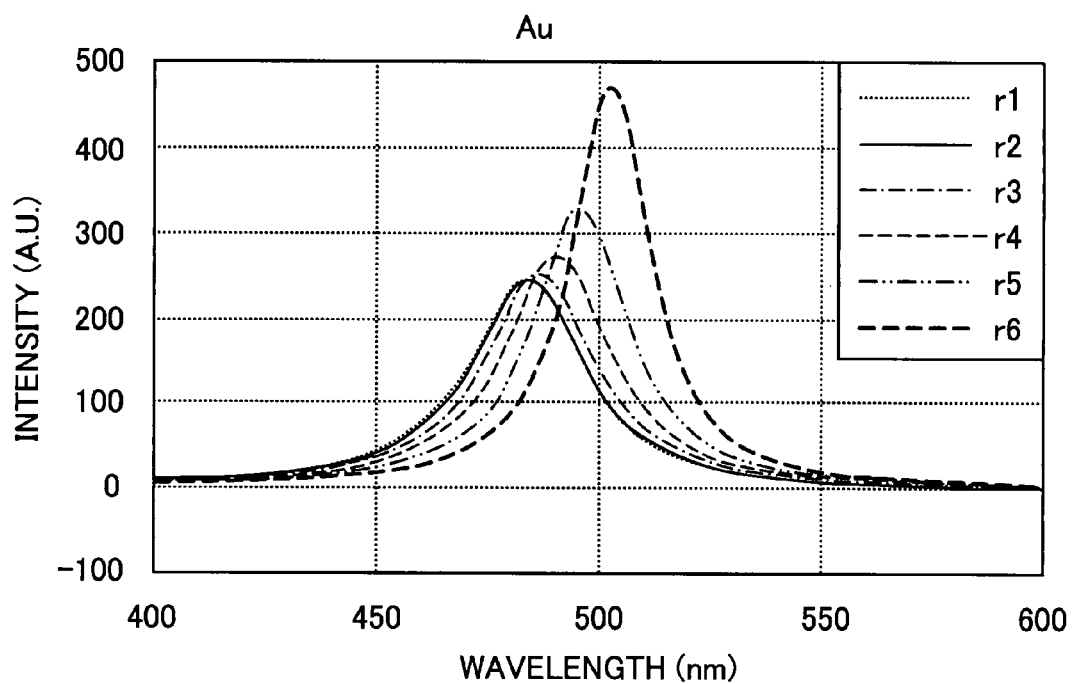
FIG. 26A is a graph of a resonance intensity of each metal particle if the particle is Ag.
Figure 26B:
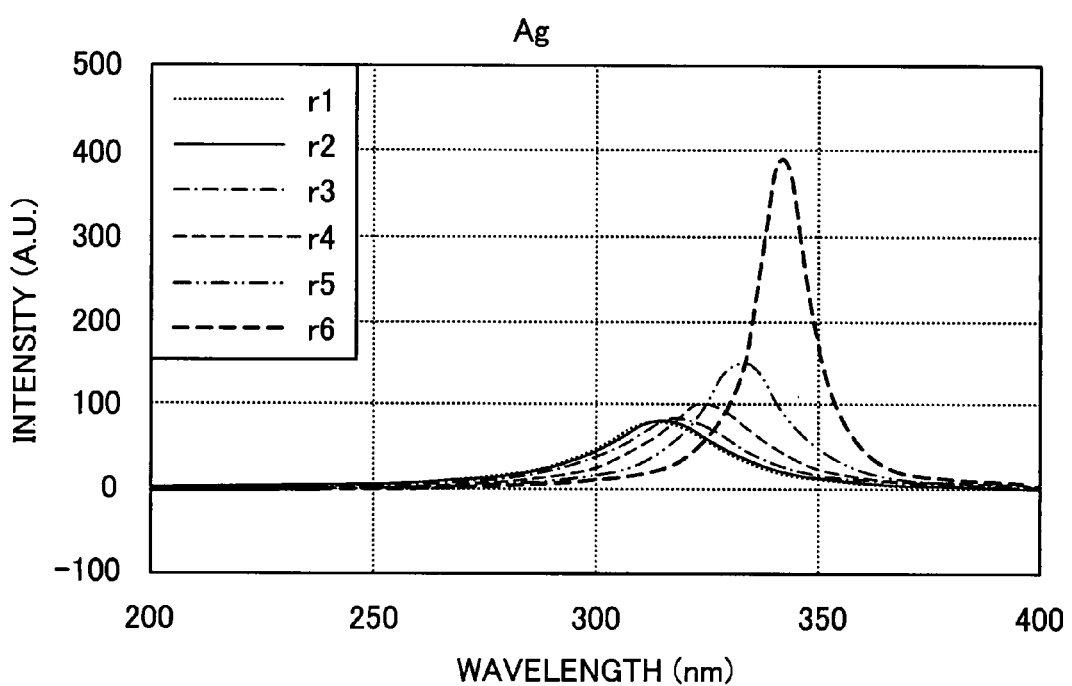
FIG. 26B is a graph of a resonance intensity of each metal particle if the particle is Au.

Meanwhile, the local plasmon resonance wavelength differs according to the magnitude of the metal particle. A result of a calculation according to the Mie scattering theory is as follows. As shown in the graph of FIG. 26B, the wavelength at which the resonance intensity of Ag has a peak is 340 nanometers if a radius of the particle is r6 (25 nanometers) and 316 nanometers if the radius is 42 (5 nanometers). As shown in the graph of FIG. 26A, if a light at the wavelength of 500 nanometers is irradiated onto Au, the resonance intensity for the particle having the radius of r6 (25 nanometers) is three times or more higher than that for the particle having the radius of r2 (5 nanometers). Accordingly, by designing the polarization control device 10 according to the seventh embodiment while selecting such a particle size as to produce an appropriate resonance according to the metal and the wavelength of the light source to be used, the wavelength plate that transforms the polarized state into the desired polarized state can be manufactured. The Mie scattering is a phenomenon that a progress direction of the light is changed without changing the wavelength of the light and the energy of the light if the light passes through a medium containing particles (scattered members) each about a size equal to the wavelength of the light.

Figure 27:
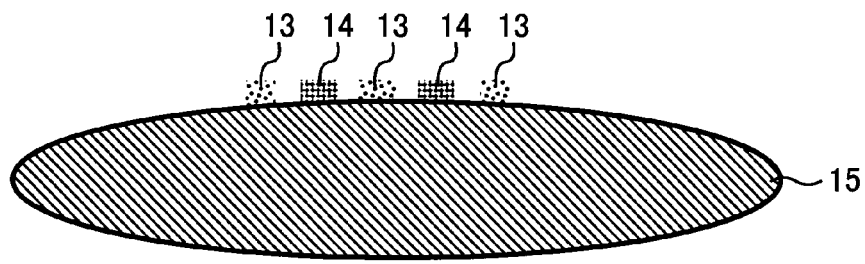
FIG. 27 is a cross-sectional view of an instance that the polarization control device is formed integrally on a lens.

An instance that the metal particle pattern is formed on the lens or micro-lens array optical device will next be explained. FIG. 27 is a cross-sectional view of an instance that different metal particles are formed into a predetermined pattern on the lens 15. Namely, the first metal particles 13 and the second metal particles 14 are arranged into the pattern shown in, for example, FIG. 22 or 25. In this case, manufacturing steps are basically the same as those shown in FIG. 23. By integrally forming optical functions of the polarization control device 10 according to the seventh embodiment, optical functions that are conventionally constituted separately by the wavelength plate and the lens are realized only by the lens 15. Therefore, a space saving can be realized, and operations required for an optical axis adjustment, a focal adjustment, and the like can be easily performed. Time required for these operations can be also reduced.

Figure 28:
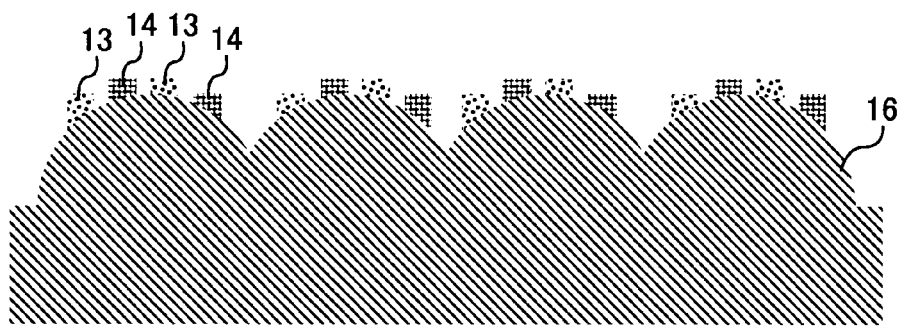
FIG. 28 is a cross-sectional view of an instance that the polarization control device is formed integrally on a micro-lens array optical device.

FIG. 28 is a cross-sectional view of an instance that different metal particles are formed into a predetermined pattern on the micro-lens array optical device 16. Namely, the first metal particles 13 and the second metal particles 14 are arranged into the pattern shown in, for example, FIG. 22 or 25. In this case, manufacturing steps are basically the same as those shown in FIG. 23. By integrally forming optical functions of the polarization control device 10 according to the seventh embodiment, optical functions that are conventionally constituted separately by the wavelength plate and the micro-lens array optical device are realized only by the micro-lens array optical device 16. Therefore, a space saving can be realized, and operations required for an optical axis adjustment, a focal adjustment, and the like can be easily performed. Time required for these operations can be also reduced.

In an eighth embodiment of the present invention, a polarization control device 10 configured so that which a plurality of metal fine structures are arranged in the range equal to or smaller than the wavelength of the incident light will be explained. The interaction is thereby generated by the near-field light between the adjacent metal fine structures. The optical characteristics of transmitting and reflecting the device are controlled by the optical radiation and optical absorption by the interaction. According to the eighth embodiment, in particular, the polarization control device 10 is configured as follows. The support substrate on which the metal fine structures are arranged has a sub-wavelength structure, thereby generating an evanescent light strong against a surface layer of the support substrate 1. By combining the near-field light with the evanescent light, the optical radiation and the optical absorption are made stronger, thus improving the optical characteristic control characteristics of the polarization control device 10 according to the eighth embodiment.

Figure 29:
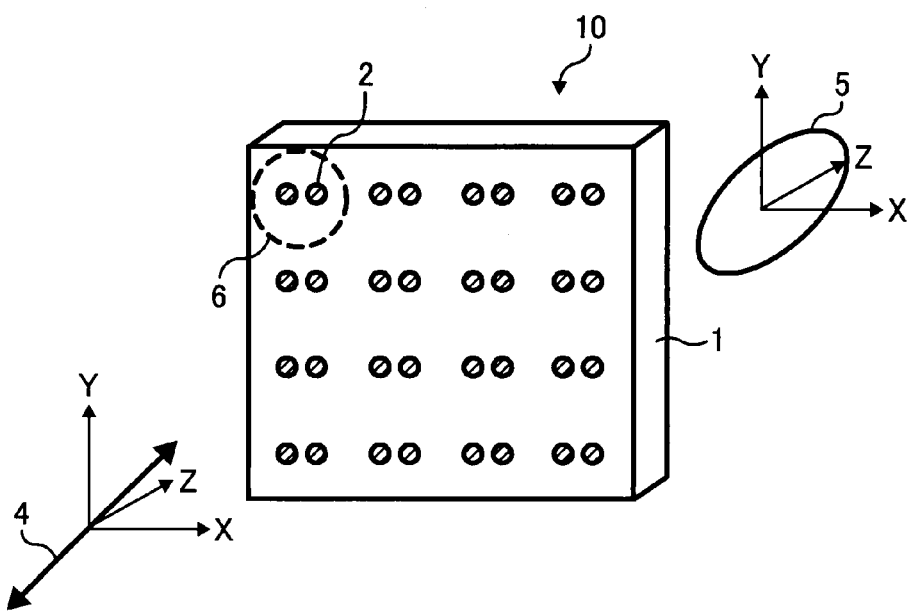
FIG. 29 is an explanatory view of a function of a polarization control device according to an eighth embodiment of the present invention.

FIG. 29 is an explanatory view of a function of the polarization control device 10 according to the eighth embodiment. As shown in FIG. 29, a plurality of metal compound structures 6 each constituted by the metal fine structures 2 are formed on the support substrate 1 consisting of optically flat glass. A light is irradiated onto the support substrate 1 on which these metal compound structures 6 are formed. If the metal compound structures 6 are present asymmetrically with respect to the incident polarized light (are anisotropic in the X and Y directions), a phase difference is generated between the two adjacent metal fine structures 2 by the near-field light interaction between the two metal fine structures 2 to depend on the resonance frequencies of the local surface plasmons generated in the respective structures 2. Due to this, a phase difference is also generated between the polarized light components of the reflected light or the transmitted light obtained by superimposing the lights from the respective structures 2. The polarized state of the emission light is thereby transformed.

Namely, if the linearly polarized light 4 inclined at 45 with respect to, for example, the Y-axis direction is incident on the support substrate 1 on which the metal fine structures 2 are formed as shown in FIG. 29, the light transmitted by the support substrate 1 is transformed into the elliptically polarized light 5. While the metal fine structure 2 is circular in this embodiment, it may not be circular but can be, for example, elliptic or polygonal. Alternatively, the metal fine structure 2 can be configured so that circular structures are arranged continuously so as to form a pseudo-elliptic structure. Furthermore, if the light is incident on the support substrate 1 so that the light contains asymmetric components with respect to the structures 2 thus formed, the phase difference is generated between the structures 2.

The material for these metal fine structures 2 can be selected so as to generate plasmon at the wavelength of the light source to be used and to give a desired phase difference to the emission light. Examples of the material include Au, Ag, Al, Pt, Ni, Cr, and Cu as well as alloys thereof. The material is particularly preferably Au, Ag, or Al. As shown in FIG. 15, it is assumed herein that a magnitude (a diameter) of each metal fine structure 2 is R, a distance between centers of two most adjacent metal fine structures 2 in the x direction is d. A combination of the two adjacent metal fine structures 2 in the x direction is A, and a combination of the metal fine structures 2 most adjacent to the combination A in the x direction is B. A distance between the combinations A and B is d1. A combination of the metal fine structures 2 most adjacent to the combination A in the y direction is C, and a distance between the combinations A and C is d2. If so, it is desirable that each of R, d1, and d2 is smaller than the wavelength of the incident light. To use the near-field interaction generated between the two adjacent metal fine structures 2, it is necessary that the central distance d satisfies at least d<R. To lessen the influence of the interaction between the adjacent combinations of the metal fine structures 2, it is necessary that the distances d1 and d2 are larger than R.

Figure 30:
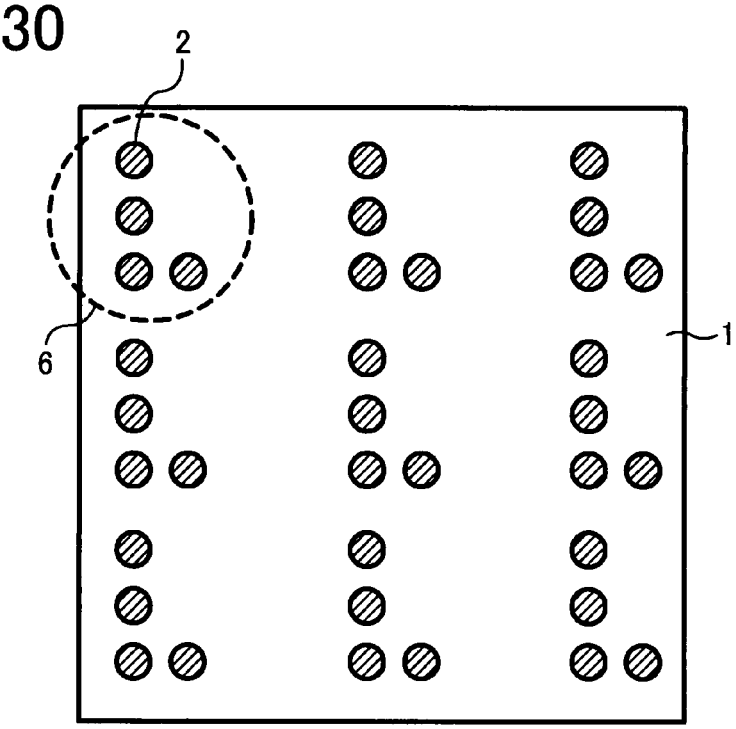
FIG. 30 is an explanatory view of a magnitude of each metal fine structure that constitutes the polarization control device, a distance relationship among the metal fine structures, and the like according to the eighth embodiment.

As shown in FIG. 30, an L-shaped or a V-shaped metal compound structure 6 can be formed by a combination of three or a plurality of metal fine structures 2. In the example of FIG. 30, similarly to the configuration shown in FIG. 15, it is preferable that the distance between the two adjacent metal fine structures 2 is sufficiently smaller than the magnitude of each metal fine structure 2. It is also preferable that the distance between the two L-shaped structures 6 is sufficiently larger than the magnitude of each metal fine structure 2 that constitutes the L-shaped structure 6. Similarly to the above, if the light is incident on the support substrate 1 at an angle at which the light contains asymmetric polarized light components with respect to the metal fine structures 2 thus formed, a phase difference is generated between the two polarized light components of the transmitted or reflected light.

The polarization control device 10 according to the eighth embodiment can be manufactured as follows. A substrate consisting of optical glass as the inorganic material is formed as the support substrate 1. A metal thin film is formed on a flat surface of an optical glass substrate by depositing thereon the metal material, such as Au, Ag, and Al, by a film forming method using the CVD or the PVD or by a deposition method such as plating. A photoresist layer is formed on this metal thin film. A resist pattern is formed on the photoresist layer so as to leave a pattern corresponding to desired fine structures by such a method as electron beam lithography or X-ray lithography. Thereafter, unnecessary parts of the metal thin film are etched away by, for example, the RIE. The desired metal fine structure pattern can be thereby formed.

Alternatively, the substrate consisting of optical glass as the inorganic material is formed as the support substrate 1. A photoresist layer is formed on the flat surface of the optical glass substrate. A resist pattern is formed on this photoresist layer so as to leave parts other than the pattern corresponding to the desired fine structures by such a method as the electron beam lithography or the X-ray lithography. Thereafter, a metal thin film is formed on the resist pattern by depositing the metal material, such as Au, Ag, and Al, by the film forming method using the CVD or the PVD or by the deposition method such as plating. Thereafter, the resist film is removed to thereby remove unnecessary parts of the metal film formed on the resist film. The desired metal fine structure pattern can be thereby formed.

Examples of the inorganic material for the glass substrate include quartz glass, borosilicate glass such as $BK_7$ and Pyrex, and optical crystal materials such as $CaF_2$, Si, ZnSe, and $Al_2O_3$. If the reflecting device is used as the polarization control device 10 according to the eighth embodiment, the support substrate 1 preferably consists of a material having a high reflectance. Examples of this material include optical glasses and optical crystal materials each coated with a metal film such as an Al film or an Au film. Alternatively, the polarization control device 10 according to the eighth embodiment can be used as a half mirror using both of the transmitted light and the reflected light, by using the support substrate 1 consisting of a material coated with a Cr film, as a partially reflecting film.

Another example of the configuration of the polarization control device 10 according to the eighth embodiment will be explained with reference to FIG. 31. In this example, the metal compound structures are arranged on the support substrate 1 that has a periodic (lattice) structure a height of which is modulated in a shorter period than the wavelength of the incident light on its surface. With this configuration, when the light is incident on the support substrate 1, a higher-order diffraction light is not generated but the evanescent light is generated on the surface layer of the glass substrate. The evanescent light thus generated is propagated onto the surface of the support substrate 1 in a direction of a lattice vector, and strongly coupled with the local surface plasmons near the respective metal fine structures 2. Therefore, the optical radiation and the optical absorption can be generated in the respective metal fine structures 2 more strongly. The evanescent light is generally known as a special light used to excite the light in a range limited to vicinities of a boundary surface.

In the former example shown in FIG. 30, the light intensity of the optical component of the near-field light from each metal fine structure 2 is relatively low to that of the reflected light or transmitted light by the support substrate 1. Due to this, the latter optical component of the near-field light from the meal fine structure 2 is often "buried" in that of the reflected or transmitted light by the support substrate 1. Extraction of the polarization control effect produced by the metal fine structure 2 is limited to the instance that the reflected light by the metal fine structure 2 arranged on, for example, the support substrate 1 low in reflectance. By intensifying the local surface plasmon by the evanescent light and generating the stronger optical radiation and optical absorption, a polarization control signal light having a high contrast can be obtained. The problem of "burying" the component can be avoided.

Figure 31:
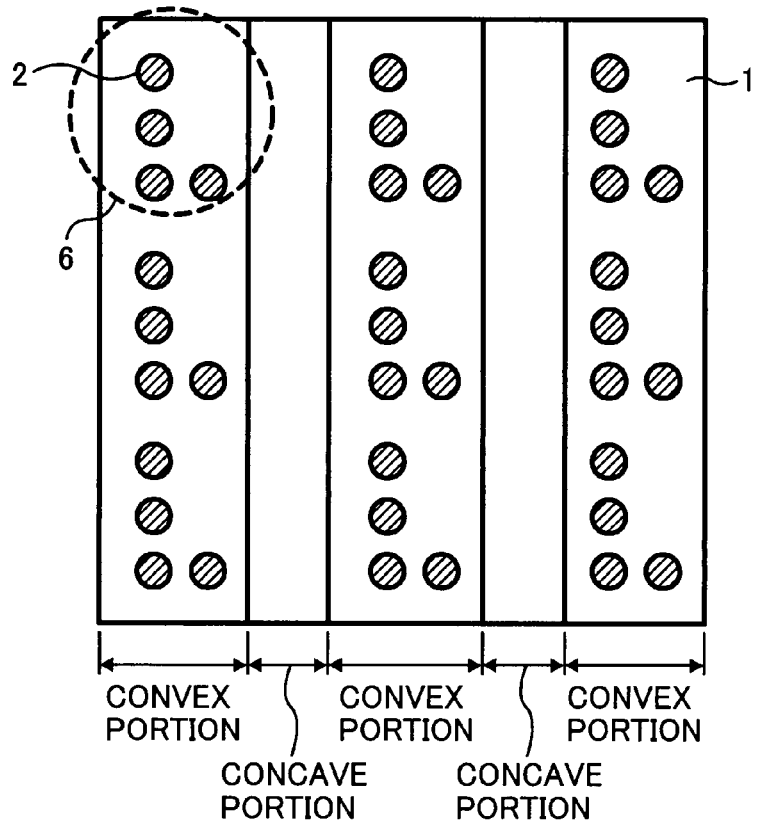
FIG. 31 is an explanatory view of an example (1) of a sub-wavelength structure substrate configured so that the metal fine structures are arranged on the substrate that has a periodic structure a height of which is modulated in a shorter period than a wavelength of an incident light according to the eighth embodiment.

In the example of FIG. 31, the substrate having the fine periodic structure is used only to generate the evanescent light. Alternatively, the optical control function of the conventional substrate of the fine periodic structure can be used with the polarization control function produced by the radiation of the near-field light from the metal fine structure.

Figure 32:
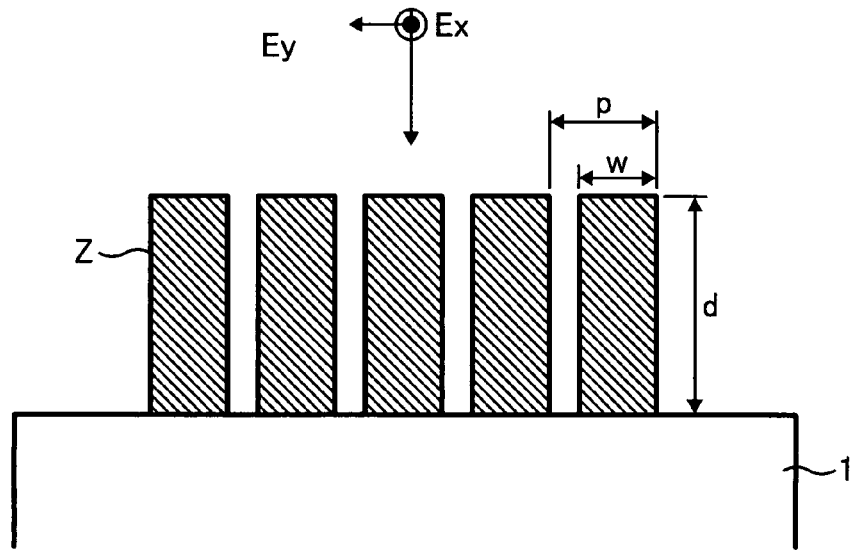
FIG. 32 is an explanatory view of symbol conditions related to fill factor in the metal fine structures.

With reference to FIG. 32, for example, in a sub-wavelength-structured substrate, it is possible to realize a device that can control a wave front of a transmitted light and that can converge and polarize the transmitted light by modulating an area ratio between a concave portion and a convex portion per unit period (fill factor-modulation) with a structure period fixed. By combining this function with the polarization control function of the metal fine structure, the device that can control the wave front control function and the polarization control function independently of each other can be realized.

A refractive index of a material in a sub-wavelength range can be approximated by an effective refractive index represented by $$n_{TE} = \sqrt{fn_2^2 + (1-f)n_1^2} \tag{1}$$

-continued $$n_{TM} = \sqrt{\frac{n_1^2 n_2^2}{f n_1^2 + (1-f) n_2^2}}$$

$$f = \frac{w}{p}$$

where $n_{TE}$ is refractive index of the material for a perpendicular polarized component in which the electric field is oscillated in parallel to the structure, $n_{TM}$ is refractive index for a polarized component in which the electric field is oscillated in a direction perpendicular to the structure a refractive index, $n_1$ is refractive index of an ambient medium, $n_2$ is refractive index of the structure, f is a fill factor, w is a width of the structure, and p is a period of the structure.

Figure 33:
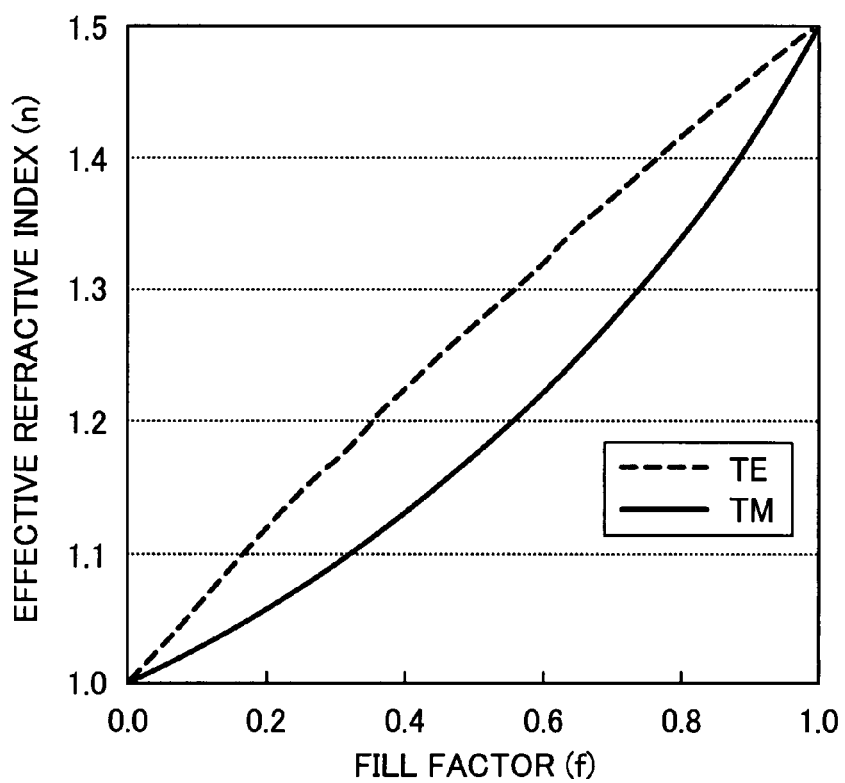
FIG. 33 is a graph of a relationship between the fill factor and the effective refractive index.

FIG. 33 depicts effective refractive indexes by the fill factor when the refractive index $n_1$ is 1.0 and the refractive index $n_2$ is 1.5, respectively. As evident from FIG. 33, both a TE wave and a TM wave can be controlled from $n_1$ to $n_2$. At this time, the effective refractive index for incident lights polarized differently accounts for a value obtained by linearly coupling effective refractive indexes for the TE wave and the TM wave by the polarized light components. It is noted that "TE" is an abbreviation of "transverse electric", which means that an electric field vector is perpendicular to a progress direction of the wave. In addition, "TM" is an abbreviation of "transverse magnetic", which means that a magnetic field vector is perpendicular to a progress direction of the wave.

If the wavelength of the incident light is λ and an optical path length of the transmitted light is d, a phase modulation amount of a zero-order transmitted light φ can be represented by the following equation using this effective refractive index n.

$$\phi = 2\pi n d / \lambda \pi$$

Furthermore, by constituting this structure on a surface of a refractive optical device, e.g., a lens, the polarization control device 10 according to the eighth embodiment that can include the wave front control function, the polarization control function, and a refractive power control function by the lens and that can control these functions independently of one another can be realized. Accordingly, the optical functions that are conventionally constituted by the two optical devices such as the wavelength plate and the lens can be integrated onto a single device. Therefore, a space saving can be realized, and a complicated optical adjustment can be simplified.

Figure 34:
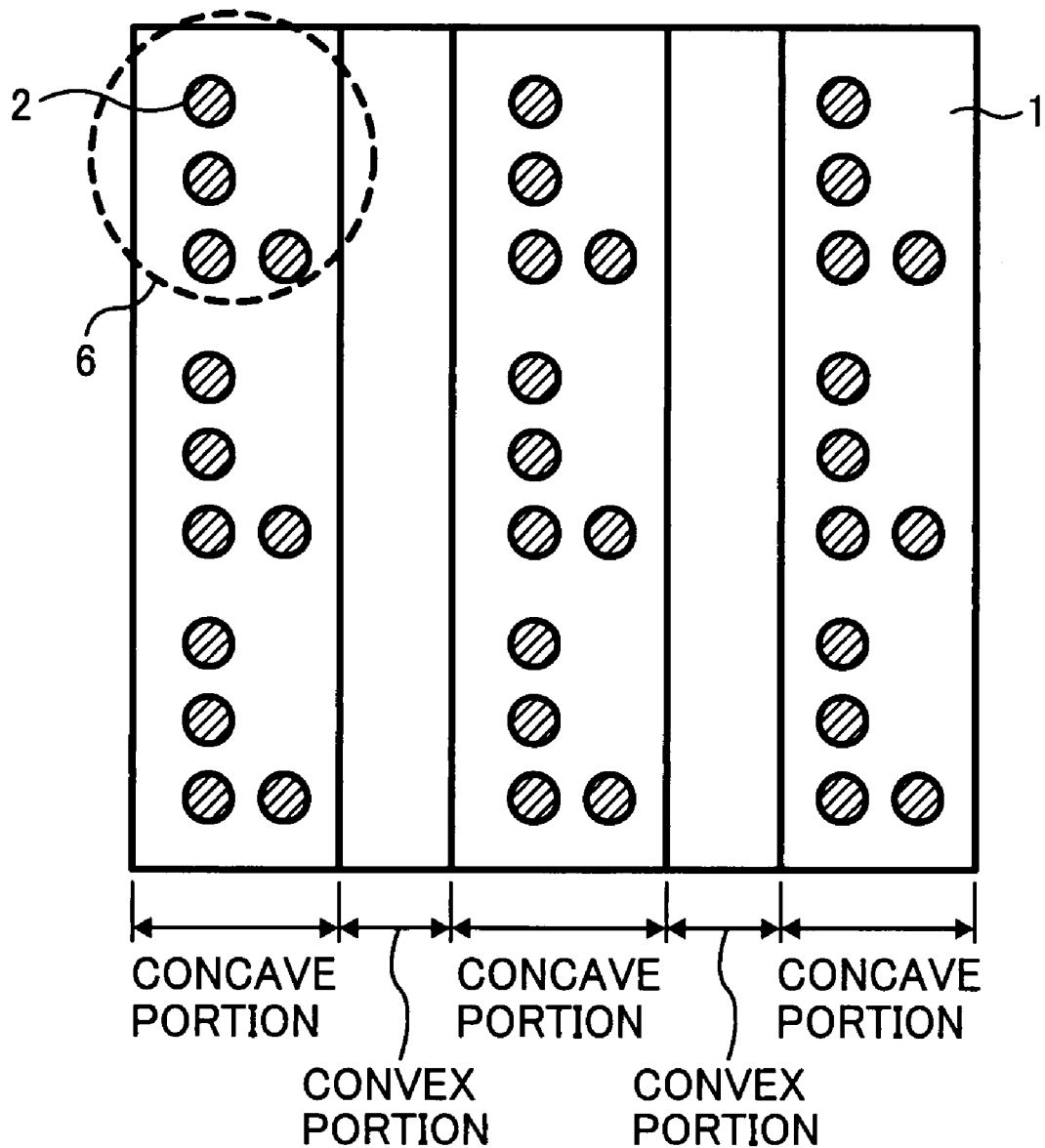
FIG. 34 is an explanatory view of an example (2) of the sub-wavelength structure substrate having the metal fine structures arranged into an L-shaped pattern.
Figure 35:
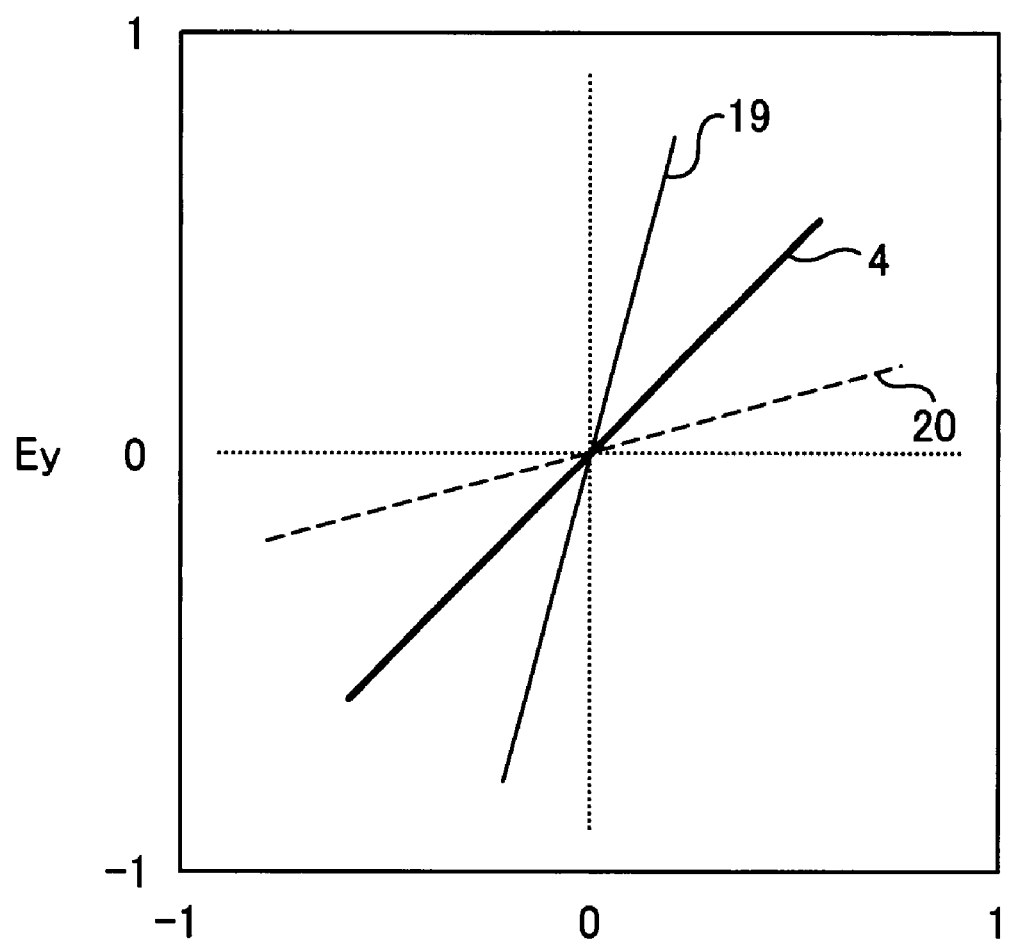
FIG. 35 is a graph of representing reflected lights by the substrate shown in FIGS. 31 and 34 by Jones vectors, respectively.

In the embodiment, the instance that the metal compound structures 6 are arranged in convex portions of the support substrate 1 as shown in FIG. 31 has been explained. Alternatively, by selecting the arrangement location of the metal compound structures 6 between the convex portions and the concave portions, the polarization characteristics of the device can be controlled. FIG. 34 depicts that the metal fin structures 2 in an array of the L-shaped pattern are arranged in the concave portions of the support substrate 1. The arrangement shown in FIG. 34 is compared with that shown in FIG. 31 in optical rotation characteristics of the reflected light by the metal fine structures with respect to the linearly polarized light a polarization angle of which is uniformly 45 degrees in the x and y directions using the Jones vectors. If so, as shown in FIG. 35, optical rotation effects opposite in direction can be obtained from the respective arrangements. In FIG. 35, reference numeral 4 denotes the linearly polarized light (incident light). In addition, reference numeral 19 denotes the reflected light by the support substrate 1 shown in FIG. 31, and reference numeral 20 denotes the reflected light by the support substrate 1 shown in FIG. 34. The Jones vector is a vector that represents the polarized state of an optical wave in the form of a 1×2 matrix.

Moreover, the local surface plasmon generated on the surface of the optical device (the polarization control device) thus configured is also referred to as "near-field light", which is locally scattered in the range equal to or smaller than the wavelength of the light. Due to this, by using the device as the near-field optical device, it is possible to measure and analyze the light at a resolution equal to or lower than the diffraction limit. By applying the device to the optical lithography, it is possible to perform finer patterning than conventional patterning. In the latter case, in particular, the device can be made sensitive to a light from a visible light source, which light does not react with a resist, due to an action produced by a non-adiabatic process of the near-field light. This can dispense with a short wavelength light source and an optical device corresponding to this light source. Therefore, a manufacturing cost can be advantageously reduced.

As explained so far, the polarization control device according to the present invention is useful as an optical device including convergent, divergent, diffracting, and hologram functions, a thin optical device used in the optical communication, the optical information processing or the like. The polarization control device is also useful in a laser recording apparatus, a display apparatus, and an image forming apparatus using these devices. The polarization control device is particularly suitable for an image projecting apparatus such as a liquid crystal projector.

According to an embodiment of the present invention, by arranging two or more metal fine structures at a distance equal to about the size of each metal fine structure, the interaction between the plasmons in the respective metal fine structures through the near-field light can be generated. In addition, the phase difference different between the array direction of the metal fine structures and the direction orthogonal to the array direction can be generated. Therefore, it is advantageously possible to realize the polarization control device high in optical transmittance or reflectance in the non-absorption or non-reflection (scattering) device. In addition, the polarization control device high in design flexibility can be provided.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A polarization control device comprising:
a support substrate on which a metal compound structure is formed, wherein
the metal compound structure is formed with at least two metal fine structures arranged periodically in a range equal to or smaller than a wavelength of an incident light, and wherein
a surface structure of the support substrate is formed on a curved surface having a modulation period larger than the wavelength of the incident light.

2. The polarization control device of claim 1, wherein each of said at least two metal fine structures has a size less than or equal to 100 nm.

3. The polarization control device according to claim 1, wherein the metal compound structure is obtained by depositing a first metal material, a dielectric material, and a second metal material.

4. The polarization control device according to claim 1, wherein the metal fine structures are formed with at least one of silver, gold, platinum, aluminum, and copper, which generate a plasmon.

5. The polarization control device according to claim 1, wherein the metal compound structure is formed by a periodic structure arranged in one of a square lattice array and a hexagonal lattice array.

6. The polarization control device according to claim 1, wherein the metal compound structure is formed with the metal fine structures arranged in an asymmetric manner.

7. The polarization control device according to claim 1, wherein the metal compound structure is arranged two-dimensionally on the support substrate at a distance smaller than the wavelength of the incident light.

8. The polarization control device according to claim 7, wherein the metal compound structure is formed with two metal fine structures.

9. The polarization control device according to claim 7, wherein the metal compound structure is formed with the metal fine structures arranged in an L-shape.

10. The polarization control device according to claim 7, wherein the metal compound structure is formed with the metal fine structures arranged in a T-shape.

11. The polarization control device according to claim 7, wherein the metal compound structure is formed with the metal line structures arranged in a swastika-shape.

12. The polarization control device according to claim 7, wherein a light incident on the metal fine structures is incident at an angle at which the light contains a polarization component in a direction asymmetric with respect to the metal fine structures.

13. The polarization control device according to claim 1, wherein the support substrate is formed with a dielectric material.

14. The polarization control device according to claim 1, wherein the metal fine structures are at least two types of metals or alloys of at least two types of metals.

15. The polarization control device according to claim 1, wherein the support substrate is formed in a lens-shape.

16. The polarization control device according to claim 1, wherein the support substrate is formed in a micro-lens array-shape.

17. The polarization control device according to claim 1, wherein the metal compound structure is formed by a linearly arrayed periodic structure.

18. A polarization control device comprising:
a support substrate; and
a periodic structure provided on a surface of the support substrate, wherein
a surface structure of the support substrate is formed on a curved surface having a modulation period larger than a wavelength of an incident light,
a height is periodically modulated and the periodic structure is formed with a period smaller than the wavelength of the incident light,
a metal compound structure is formed on the periodic structure and is formed with at least two metal fine structures arranged periodically in a range equal to or smaller than the wavelength of the incident light, and
said at least two metal fine structures are configured to produce a plasmon vibration for causing a desired light modulation effect.

19. The polarization control device according to claim 18, wherein an area ratio of a concave portion to a convex portion per unit period in the periodic structure of the support substrate is modulated in an entire area or a part of a surface of the support substrate.

20. The polarization control device according to claim 18, wherein the metal compound structure is arranged on either one of a convex portion and a concave portion in the periodic structure of the support substrate.

21. A polarization control device comprising:
a support substrate; and
a periodic structure provided on a surface of the support substrate, wherein
a metal compound structure is formed on the periodic structure, and the metal compound structure is formed with at least two metal fine structures arranged periodically in a range equal to or smaller than a wavelength of an incident light,
wherein a surface structure of the support substrate is formed on a curved surface having a modulation period larger than the wavelength of the incident light.

* * * * *